(12) United States Patent  
Manrique et al.

(10) Patent No.: US 9,102,128 B2  
(45) Date of Patent: Aug. 11, 2015

(54) MULTILAYER FILMS

(75) Inventors: Antonio Manrique, Tarragona (ES); Shaun Parkinson, Tarragona (ES); Andreas Mayer, Wollerau (CH)

(73) Assignee: Dow Global Technologies LLC, Midland, MI (US)

( * ) Notice: Subject to any disclaimer, the term of this patent is extended or adjusted under 35 U.S.C. 154(b) by 1040 days.

(21) Appl. No.: 12/254,046

(22) Filed: Oct. 20, 2008

(65) Prior Publication Data

US 2009/0104424 A1   Apr. 23, 2009

(30) Foreign Application Priority Data

Oct. 22, 2007   (EP) .................................. 07381070

(51) Int. Cl.
| | |
|---|---|
| *B32B 7/02* | (2006.01) |
| *B32B 27/32* | (2006.01) |
| *B29C 47/00* | (2006.01) |
| *B29C 47/04* | (2006.01) |
| *B29K 23/00* | (2006.01) |

(52) U.S. Cl.
CPC .............. *B32B 27/32* (2013.01); *B29C 47/0021* (2013.01); *B29C 47/0057* (2013.01); *B29C 47/04* (2013.01); *B32B 27/327* (2013.01); *B29K 2023/06* (2013.01); *B29K 2023/0616* (2013.01); *B32B 2250/05* (2013.01); *B32B 2250/24* (2013.01); *B32B 2307/50* (2013.01); *B32B 2307/54* (2013.01); *B32B 2307/558* (2013.01); *B32B 2307/582* (2013.01); *B32B 2307/72* (2013.01)

(58) Field of Classification Search
CPC .. B32B 27/32; B32B 27/327; B32B 2250/05; B32B 2250/24; B32B 2307/50; B32B 2307/54; B32B 2307/558; B32B 2307/582; B32B 2307/72; B29C 47/0021; B29C 47/0057; B29C 47/04; B29K 2023/06; B29K 2023/0616

USPC ............ 428/34.6, 35.7, 212–216, 220, 411.1, 428/500, 512–517, 519, 521, 523

See application file for complete search history.

(56) References Cited

U.S. PATENT DOCUMENTS

| | | |
|---|---|---|
| 2,973,344 A | 2/1961 | Fasce |
| 2,997,432 A | 8/1961 | Koble et al. |
| 3,456,044 A | 7/1969 | Pahlke et al. |

(Continued)

FOREIGN PATENT DOCUMENTS

| | | |
|---|---|---|
| EP | 0 243 510 A1 | 11/1987 |
| EP | 0 274 906 A2 | 7/1988 |

(Continued)

OTHER PUBLICATIONS

Mueller et al. "Breathable Polymer Films Produced by the Microlayer Coextrusion Process". Journal of Applied Polymer Science, vol. 78, (2000); pp. 816-828.*

(Continued)

*Primary Examiner* — Prashant J Khatari  
(74) *Attorney, Agent, or Firm* — Whyte Hirschboeck Dudek S.C.

(57) ABSTRACT

Multilayer films comprising three or more layers have improved properties for a variety of applications. The multilayer films often have a total thickness of from about 10 to about 50 microns. Blown multilayer film properties may include excellent cling with reduced unwinding noise levels. Cast multilayer film properties include improved elasticity, impact, puncture, and tear properties.

18 Claims, 6 Drawing Sheets

(56) References Cited

U.S. PATENT DOCUMENTS

| | | |
|---|---|---|
| 3,555,604 A | 1/1971 | Pahlke |
| 3,645,992 A | 2/1972 | Elston |
| 3,873,642 A | 3/1975 | Jezl |
| 4,146,492 A | 3/1979 | Cusano et al. |
| 4,299,931 A | 11/1981 | Coran et al. |
| 4,352,849 A | 10/1982 | Mueller |
| 4,429,079 A | 1/1984 | Shibata et al. |
| 4,486,552 A | 12/1984 | Niemann |
| 4,510,031 A | 4/1985 | Matsumura et al. |
| 4,668,752 A | 5/1987 | Tominari et al. |
| 4,668,753 A | 5/1987 | Kashiwa et al. |
| 4,755,403 A | 7/1988 | Ferguson |
| 4,780,228 A | 10/1988 | Gardiner et al. |
| 4,798,081 A | 1/1989 | Hazlitt et al. |
| 4,820,557 A | 4/1989 | Warren |
| 4,863,769 A | 9/1989 | Lustig et al. |
| 4,865,902 A | 9/1989 | Golike et al. |
| 4,886,690 A | 12/1989 | Davis et al. |
| 4,906,517 A | 3/1990 | Akao et al. |
| 4,927,708 A | 5/1990 | Herran et al. |
| 4,952,451 A | 8/1990 | Mueller |
| 4,957,790 A | 9/1990 | Warren |
| 4,963,419 A | 10/1990 | Lustig et al. |
| 4,963,427 A | 10/1990 | Botto et al. |
| 4,976,898 A | 12/1990 | Lustig et al. |
| 5,006,398 A | 4/1991 | Banerji |
| 5,032,463 A | 7/1991 | Smith |
| 5,055,328 A | 10/1991 | Evert et al. |
| 5,059,481 A | 10/1991 | Lustig et al. |
| 5,068,047 A | 11/1991 | Chung et al. |
| 5,089,321 A | 2/1992 | Chum et al. |
| 5,094,793 A | 3/1992 | Schrenk et al. |
| 5,112,674 A | 5/1992 | German et al. |
| 5,202,074 A | 4/1993 | Schrenk et al. |
| 5,266,626 A | 11/1993 | Hert et al. |
| 5,272,236 A | 12/1993 | Lai et al. |
| 5,322,728 A | 6/1994 | Davey et al. |
| 5,380,479 A | 1/1995 | Schrenk et al. |
| 5,391,629 A | 2/1995 | Turner et al. |
| 5,468,810 A | 11/1995 | Hayakawa et al. |
| 5,540,878 A | 7/1996 | Schrenk et al. |
| 5,594,080 A | 1/1997 | Waymouth et al. |
| 5,597,881 A | 1/1997 | Winter et al. |
| 5,610,253 A | 3/1997 | Hatke et al. |
| 5,624,991 A | 4/1997 | Harada et al. |
| 5,628,950 A | 5/1997 | Schrenk et al. |
| 5,733,980 A | 3/1998 | Cozewith et al. |
| 5,741,566 A | 4/1998 | Hogstrom et al. |
| 5,783,531 A | 7/1998 | Andrew et al. |
| 5,798,420 A | 8/1998 | Cozewith et al. |
| 5,844,045 A | 12/1998 | Kolthammer et al. |
| 5,847,053 A | 12/1998 | Chum et al. |
| 5,868,984 A | 2/1999 | Winter et al. |
| 5,892,076 A | 4/1999 | Nickias |
| 5,916,953 A | 6/1999 | Jacoby et al. |
| 5,969,070 A | 10/1999 | Waymouth et al. |
| 5,994,255 A | 11/1999 | Nickias et al. |
| 6,008,262 A | 12/1999 | McKay et al. |
| 6,025,448 A | 2/2000 | Swindoll et al. |
| 6,096,668 A | 8/2000 | Abuto et al. |
| 6,114,457 A | 9/2000 | Markel et al. |
| 6,121,402 A | 9/2000 | Machida et al. |
| 6,136,937 A | 10/2000 | Lai et al. |
| 6,147,180 A | 11/2000 | Markel et al. |
| 6,160,029 A | 12/2000 | Chaudhary et al. |
| 6,187,424 B1 | 2/2001 | Kjellqvist et al. |
| 6,197,404 B1 | 3/2001 | Varona |
| 6,262,203 B1 | 7/2001 | Chien et al. |
| 6,265,055 B1 * | 7/2001 | Simpson et al. ............. 428/213 |
| 6,362,252 B1 | 3/2002 | Prutkin |
| 6,380,341 B1 | 4/2002 | Waymouth et al. |
| 6,388,040 B1 | 5/2002 | Fujita et al. |
| 6,455,638 B2 | 9/2002 | Laughner et al. |
| 6,537,472 B2 | 3/2003 | Masubuchi |
| 6,566,446 B1 | 5/2003 | Parikh et al. |
| 6,566,544 B1 | 5/2003 | Waymouth et al. |
| 6,623,866 B2 * | 9/2003 | Migliorini et al. ............. 428/516 |
| 6,815,023 B1 | 11/2004 | Tatarka et al. |
| 6,872,462 B2 * | 3/2005 | Roberts et al. ............. 428/516 |
| 7,005,395 B2 | 2/2006 | Zafiroglu et al. |
| 7,018,719 B2 | 3/2006 | Ueyama et al. |
| 7,355,089 B2 | 4/2008 | Chang et al. |
| 7,504,347 B2 | 3/2009 | Poon et al. |
| 7,514,517 B2 | 4/2009 | Hoenig et al. |
| 7,524,911 B2 | 4/2009 | Karjala et al. |
| 2002/0077401 A1 * | 6/2002 | Chaudhary et al. ............. 524/394 |
| 2003/0027954 A1 | 2/2003 | Becke et al. |
| 2003/0088037 A1 | 5/2003 | Stevens et al. |
| 2003/0118853 A1 * | 6/2003 | Cook et al. ............. 428/521 |
| 2003/0194575 A1 | 10/2003 | Tau et al. |
| 2003/0195128 A1 | 10/2003 | Deckman et al. |
| 2003/0195308 A1 | 10/2003 | Waymouth et al. |
| 2003/0216518 A1 | 11/2003 | Tau et al. |
| 2004/0082750 A1 | 4/2004 | Tau et al. |
| 2004/0092662 A1 | 5/2004 | Goto et al. |
| 2004/0121922 A1 | 6/2004 | Okada et al. |
| 2004/0158011 A1 | 8/2004 | Jain et al. |
| 2004/0192147 A1 | 9/2004 | Smith et al. |
| 2005/0009993 A1 | 1/2005 | Morioka et al. |
| 2005/0037219 A1 | 2/2005 | Ohlsson et al. |
| 2006/0030667 A1 | 2/2006 | Yalvac et al. |
| 2006/0188678 A1 * | 8/2006 | Ohlsson et al. ............. 428/35.7 |
| 2006/0198983 A1 | 9/2006 | Patel et al. |
| 2006/0199030 A1 | 9/2006 | Liang et al. |
| 2006/0199744 A1 | 9/2006 | Walton et al. |
| 2006/0199872 A1 | 9/2006 | Prieto et al. |
| 2006/0199887 A1 | 9/2006 | Liang et al. |
| 2006/0199896 A1 | 9/2006 | Walton et al. |
| 2006/0199905 A1 | 9/2006 | Hughes et al. |
| 2006/0199906 A1 | 9/2006 | Walton et al. |
| 2006/0199908 A1 | 9/2006 | Cheung et al. |
| 2006/0199910 A1 | 9/2006 | Walton et al. |
| 2006/0199911 A1 | 9/2006 | Markovich et al. |
| 2006/0199912 A1 | 9/2006 | Fuchs et al. |
| 2006/0199914 A1 | 9/2006 | Harris et al. |
| 2006/0199930 A1 | 9/2006 | Shan et al. |
| 2006/0199931 A1 | 9/2006 | Poon et al. |
| 2006/0205833 A1 | 9/2006 | Martinez et al. |
| 2006/0211819 A1 | 9/2006 | Hoenig et al. |
| 2007/0010616 A1 | 1/2007 | Kapur et al. |
| 2007/0269622 A1 * | 11/2007 | Chuprevich et al. ......... 428/34.2 |
| 2008/0263999 A1 | 10/2008 | Ohlsson et al. |
| 2008/0299857 A1 | 12/2008 | Harding et al. |
| 2009/0068431 A1 | 3/2009 | Hoenigmann |
| 2011/0003099 A1 | 1/2011 | Vinck |

FOREIGN PATENT DOCUMENTS

| | | |
|---|---|---|
| EP | 0 243 965 B1 | 3/1992 |
| EP | 0 333 508 B1 | 2/1994 |
| EP | 0 404 969 B1 | 12/1994 |
| EP | 0 816 069 A2 | 1/1998 |
| EP | 0 958 313 A1 | 8/1998 |
| EP | 0 877 050 | 11/1998 |
| EP | 1 026 184 | 8/2000 |
| EP | 1 097 976 A2 | 5/2001 |
| EP | 1 162 219 A1 | 12/2001 |
| EP | 1 262 498 A2 | 12/2002 |
| EP | 1 300 238 A2 | 4/2003 |
| EP | 1332868 A1 | 8/2003 |
| EP | 1 454 931 A1 | 9/2004 |
| EP | 1 588 843 A1 | 10/2005 |
| JP | 03-038342 | 2/1991 |
| JP | 09-208761 A | 2/1996 |
| JP | 2002-206007 A | 3/2001 |
| JP | 2004-204058 A | 12/2002 |
| JP | 2004-155187 | 6/2004 |
| JP | 2004-204058 | 7/2004 |
| JP | 2005-254710 | 9/2005 |
| WO | WO 95/27745 | 10/1995 |
| WO | WO 95/27746 A1 | 10/1995 |
| WO | 98/20062 A1 | 5/1998 |
| WO | WO 98/34970 A1 | 8/1998 |
| WO | WO 99/35171 A1 | 7/1999 |

(56) References Cited

FOREIGN PATENT DOCUMENTS

| WO | WO 00/37514 A1 | 6/2000 |
|---|---|---|
| WO | WO 02/066540 A2 | 8/2002 |
| WO | WO 02/079322 | 10/2002 |
| WO | WO 03/014046 A1 | 2/2003 |
| WO | WO 2005/090425 A1 | 9/2005 |
| WO | WO 2005/090426 A1 | 9/2005 |
| WO | WO 2005/090427 A2 | 9/2005 |
| WO | WO 2005/103123 A1 * | 11/2005 |
| WO | WO2006/047374 A1 * | 4/2006 |
| WO | WO 2006/115839 A1 | 11/2006 |

OTHER PUBLICATIONS

Baer et al. "Microlayer Coextrusion Technology". ANTEC '99 Conference Proceedings: vol. III, Special Areas. Society of Plastics Engineers, (1999); pp. 1-5.*
Kissin, Y.V. "Polyethylene, Linear Low Density". Kirk-Othmer Encyclopedia of Chemical Technology, (2005); pp. 1-37.*
Kirwan et al. (eds. Coles et al.). "Plastics in Food Packaging". Food Packaging Technology, CRC Press, (2003); pp. 174-240.*
"Next Generation of Polyethylene Resins". Dow Chemical Company, (2009); pp. 1-4.*
Schuman et al. "Interdiffusion of Linear and Branched Polyethylene in Microlayers Studied via Melting Behavior". Macromolecules, American Chemical Society, (1998); pp. 4551-4561.*
Kirk-Othmer, Enc. of Chem. Tech., Third Edition, John Wiley & Sons, New York (1981), vol. 16, pp. 416-417.
Jenkins et al., "Packaging Foods With Plastics", Technomic Pub. Co. (1991), pp. 11-27.
Butler, "Coextrusion", Film Extrusion Manual: Process, Materials, Properties, TAPPI Press (1992), pp. 31-80.
Schrenk et al., "Coextrusion for Barrier Packaging", Tech. Papers of Society of Plastics Engineers, RETEC Proceedings, Jun. 15-17, 1981, pp. 211-229.
Kirk-Othmer, Enc. of Chem. Tech., Third Edition, John Wiley & Sons, New York (1981), vol. 18, pp. 191-192.
Osborn et al., "Plastic Films, Technology and Packaging Applications", CRC Press (1992).
Dumbleton, "Laminations Vs. Coextrusion", Converting Magazine (Sep. 1992), pp. 112-116.
Van Der Sanden et al., "Exact™ Linear Ethylene Polymers for Enhanced Sealing Performance", ANTEC'92 Proc., pp. 154-158.
Van Der Sanden et al., "A New Family of Linear Ethylene Polymers Provides Enhanced Sealing Performance", TAPPI Proc. (1991), pp. 289-296.
Hendewerk, "New Specialty Linear Polymers (SLP) for Power Cables", 1991 IEEE Power Eng. Soc. Trans. & Distri. Conf. (Sep. 1991), Dallas, Tex., pp. 184-190.

\* cited by examiner

MULTILAYER FILMS

FIELD OF THE INVENTION

This invention relates to multilayer films comprising three or more layers and having improved properties such as cling, elasticity, impact, puncture, and/or tear.

BACKGROUND AND SUMMARY OF THE INVENTION

The present invention relates to multilayer films suitable for packaging. Such films are used in packaging such diverse items as bulk farm materials like grass and hay to small grocery store items like meats and vegetables. For all of these items it is usually desirable to have a strong, stretchy film. For example, for bulk farm materials such as grass and hay it is important to have excellent stretch and tensile properties coupled with strength to withstand punctures and tears from, for example, bale wrappers. In addition, it is often desirable that the film have UV resistance and perform well in both cool, dry conditions and warm, humid conditions. In such silage films, polyisobutylene (PIB) has often been employed as a migrating cling additive in a blown silage film. Unfortunately, films comprising PIB often are sometimes difficult to unwind efficiently and, more specifically, often have a high unwinding noise level.

Food items such as poultry, vegetables, fresh red meat, cheese, as well as nonfood industrial and retail goods, for example, are often packaged by shrink, skin, stretch and/or vacuum wrap methods. The shrink packaging method involves placing an article(s) into a bag fabricated from heat-shrinkable film material, then closing or heat sealing the bag, and thereafter exposing the bag to sufficient heat to cause shrinking of the bag and intimate contact between the bag and article. The heat can be provided by conventional heat sources, such as heated air, infrared radiation, hot water, combustion flames, or the like. Shrink wrapping of food articles helps preserve freshness, is attractive, hygienic, and allows closer inspection of the quality of the packaged food. Shrink wrapping of industrial and retail goods, which is alternatively referred to in the art and herein as industrial and retail bundling, preserves product cleanliness and also is a convenient means of bundling for accounting purposes.

The skin packaging method involves placing the product to be packaged on porous or perforated paperboard which is typically coated with an adhesive primer, then moving the loaded board to the plate of a skin packaging machine where a skin packaging film is heated until it softens and droops, relaxes and droops a second time over the loaded board. A vacuum then draws the film down around the product to provide a "skin" tight package. Skin packaging serves both the consumer retail and the transit markets. In the transit market, skin packaging protects industrial goods during transport and distribution. In the retail market, skin packaging protects consumer goods against damage and pilferage as well as provides "display appeal" to maximize the sales potential of the packaged product. While most, if not all, nonfood skin packaging film is monolayer, multilayer skin packaging films are useful for protecting food by vacuum packaging and, especially by vacuum skin packaging.

Food items are also packaged by the stretch wrapping method which involves manually pulling a film over a paper pulp or foamed polystyrene tray filled with food (or automatically pushing the tray upward to stretch the film) and then heat sealing the stretched film at its edges usually on the underside of the tray, and allowing the film to remain taut due to its elasticity. For nonfood stretch wrapping, the stretch wrap film is manually or automatically pulled and stretched over and/or around the product, and thereafter the free end of the film is clung or tacked (rather than heat sealed) to another portion of film already wrapped about the product or to the product itself usually by applying pressure in the direction towards the product or goods being wrapped. Stretch wrap packaging of fresh food is specific to the consumer retail market and it allows fresh red meat to bloom to the desired bright red color as well as allows some vegetables to appropriately respire. Stretch wrapping of nonfood items corresponds to the transit market, and includes pallet wrapping of goods as well as wrapping of new vehicles during distribution to protect exterior paint finishes from damage due to acid rain, road chips, debris, vandalism, etc.

Whereas stretch wrap packaging typically does not involve barrier film layers and is useful for both food and nonfood items, vacuum packaging involves a gas or oxygen barrier film layer and is generally reserved for red meats, processed meats and cheeses, but is also used to package odor-sensitive or odor-generating nonfood items such as cedar wood chips. There are several methods or variations of vacuum packaging including vacuum skin packaging which is also referred to in the art as vacuum form packaging. One method involves, for example, bringing a heat-softened top and bottom film web together under vacuum in a chamber with the product loaded between the webs; thereafter, heat sealing the webs together at their edges, and then evacuating or gas flushing the space containing the product. In vacuum packaging, typically the bottom web takes up the form of the food item being packaged.

While the shrink wrapping method is predicated on the heat-shrinking properties of the selected film materials, stretch overwrapping is predicated on the elasticity of the film material. Conversely, successful skin packaging is predicated on the adhesion of the film material to the primed board and the amount of time required to cause the film to double droop (cycle time). Similar to skin packaging, successful vacuum packaging depends on the time required for the film webs to sufficiently soften before being drawn by vacuum (or pushed by air pressure) about the product to be packaged. As taught in Plastics Design and Processing, November 1980, page 4, film materials with more infra-red heat absorption bands and/or with a lower Vicat softening point will tend to heat-up and soften faster, and thereby allow faster cycle times in skin and vacuum packaging. In general, polar polymers such as, for example, ethylene vinyl acetate (EVA) copolymers, ethylene acrylic acid (EAA) copolymers and ionomers, will possess more infra-red heat bands than nonpolar polymers such as polyethylene or polypropylene. Further, ionomers show more infra-red heat bands than their respective base copolymers due to the ionomerization itself.

Successful packaging or wrapping for all four methods, depends on the toughness and abuse or implosion resistance properties of the film materials themselves such that the packaged product's integrity is maintained during distribution, handling and/or display. However, toughness and abuse resistance are particularly important in food shrink wrapping and vacuum packaging which often times involves packaging of meat and other food cuts with deep cavities and sharp exposed bones as well as exposed edges that can puncture the film webs or fabricated bag during the heat-shrink or vacuuming-form operation or during subsequent package handling and distribution. To avoid premature puncturing, film producers resort to expensive practices to toughen the package such as using thicker films and bags, using an extra layer of film at critical contact points of the bag in a patch-like fashion as described by Ferguson in U.S. Pat. No. 4,755,403, or by using cross-ply or non-parallel layer constructions. Similarly, to "artificially" enhance the puncture and other abuse or implosion resistance characteristics of known film materials, food packagers routinely wrap or cap exposed bone edges with cloth, molded plastic articles or other materials.

An important shrink bundling and skin packaging property, particularly for delicate items or items which tend to crush or bend, such as paper goods, is the tension or force the film exerts on the packaged article and/or board. This attribute is known in the art as shrink tension, and films with too much shrink tension invariably yield shrink or skin packages with unsightly buckling or board curl that in severe cases can render the packaged good unusable for its intended purpose. In addition to being aesthetically unsightly, buckled or warped goods are difficult to stack uniformly on display shelves.

The film optical properties are often important for retail "point-of-purchase" shrink, skin, stretch and vacuum wrap packages. In some cases the better the contact and/or see-through clarity, the lower internal film haze and the higher film gloss or sparkleness, the more likely the package will attract a potential purchaser for closer inspection. Further, some consumers generally associate the package aesthetics, which are chiefly predicated on the optical properties of the packaging film, directly with the quality of the article to be purchased.

Another important retail "point-of-purchase" requirement, that is specific to stretch wrapping, is the ability of the film to "snap back" when deformed rather than retain the dents and impressions left from inspections by prospective purchasers. This attribute is predicated on the elastic recovery of the film material, and when elastic recovery is sufficiently high, subsequent prospective purchasers are not unnecessarily prejudiced by the package appearing as if it had been handled and repeatedly rejected.

Still another important film material characteristic, that may affect the overall success of all four packaging and wrapping methods, is the extrusion processability of the film resin during film fabrication by well known blown (bubble), cast or sheet extrusion methods. Good processability is manifested as relatively low extrusion energy consumption, a smoother film surface and as a stable bubble or web even at higher blow-up ratios, draw rates and/or film thicknesses. There are numerous benefits of a smoother, more stable film-making operation, including film widths and thicknesses are generally more uniform, the need to edge trim is reduced (which reduces waste), winding and unwinding operations are typically smoother, there are fewer film wrinkles, and the final package quality or appearance is improved.

While high pressure polymerized ethylene homopolymers and copolymers, such as low density polyethylene (LDPE) and ethylene vinyl acetate (EVA) copolymers, generally exhibit good processability during extrusion as the consequence of having relatively high degrees of long chain branching, linear olefin polymers such as linear low density polyethylene (LLDPE), ultra low density polyethylene (ULDPE), and very low density polyethylene (VLDPE), show fair-to-marginal processability even when fairly sophisticated extrusion screw designs such as barrier screws, screws with Maddock mixing sections, and other like variations are employed to better homogenize or stabilize the polymer melt stream and allow lower energy consumption and smoother polymer surfaces. Further, in attempts to maximize the toughness characteristics of known EVA, VLDPE, ULDPE and LLDPE materials, it is common practice to employ very high molecular weight grades, e.g. melt indices ($I_2$, as measured in accordance with ASTM D-1238 (190° C./2.16 kg)) of ≤0.5 g/10 minutes, which inevitably adds to processability difficulties.

To meet the diverse performance requirements involved in all four packaging and wrapping methods, various film materials have been used as single components and in blended combinations for both monolayer and multilayer packaging. For example, Smith in U.S. Pat. No. 5,032,463 discloses biaxially stretched monolayer and multilayer films comprising blends of ethylene/1-butene ultra low density polyethylene and ethylene/1-hexene ultra low density polyethylene.

As another example, Lustig et al. in U.S. Pat. No. 5,059,481 describe biaxially oriented ultra low density polyethylene monolayer and multilayer packaging films with a barrier core layer, an ethylene/vinyl acetate intermediate layer and ULDPE/EVA blends as the outer layer. In U.S. Pat. No. 4,863,769, Lustig et al. disclose the use these biaxially oriented ultra low density films as bags for packaging frozen poultry, and in U.S. Pat. No. 4,976,898, Lustig et al. disclose that the "double bubble" method can be used to prepare the biaxially oriented ultra low density polyethylene films.

In another example, Botto et al. in European Patent Application 0 243 510 and U.S. Pat. No. 4,963,427 describes a multilayer skin packaging film consisting of an ionomer, EVA and HDPE that is particularly useful for vacuum skin packaging of food.

While prior art film materials have varying degrees of toughness, implosion resistance, low temperature shrinking characteristics, and bag making heat sealing performances, even tougher film materials are desired in shrink, skin and vacuum packaging for reduced bag punctures or for maintaining puncture resistance levels when down-gauging film thicknesses for environmental source reduction purposes, cost-effectiveness or other considerations. Moreover, while low density polyethylene (LDPE) produced via free radical, high pressure polymerization of ethylene performs satisfactorily in industrial (transit) shrink and skin packaging applications, the optical properties of LDPE generally are not satisfactory for consumer retail packaging applications and in the instance of retail skin packaging, packagers are left to rely on expensive film materials, such as Surlyn™ ionomers supplied by E. I Dupont, for the desired optical appeal. However, even the expensive ionomer products show skin packaging deficiencies such as poor biaxial tear/cut resistance and insufficient drawability that can yield aesthetically unpleasing ridges and/or bridges when multiple items are packaged on a single paperboard.

Although having poor tear/cut resistance in both the machine and transverse directions is clearly an ionomer disadvantage, there is sometimes benefit to reduced tear/cut resistance in one direction or another, i.e., to facilitate easy opening of the package while maintaining its tamper-evident quality.

The search for an alternative to polyvinyl chloride (PVC) films for stretch wrap for food is another example of packagers having to rely on expensive film materials. Such alternatives have typically been olefin multilayer film. The search is important, however, because PVC has undesirable plasticizer migration tendencies as well as a growing environmental concern regarding chlorinated polymers in general. While various multilayer films have been disclosed (for example, in U.S. Pat. Nos. 5,112,674 and 5,006,398, and in EPO 0 243 965, EPO 0 333 508, and EPO 0 404 969) with similar snap-back or elastic recovery as PVC, many of these solutions involve coextrusions with ethylene copolymers such as ethylene vinyl acetate (EVA) and ethylene acrylic acid (EAA)

copolymers. Use of these polar copolymers presents processing limitations including thermal stability and recycle/trim incompatibility.

Another desired improvement over known olefin polymers is disclosed in EPO 0 404 368 where Ziegler catalyzed ethylene .alpha.-olefin copolymers such as ethylene/1-butene, ethylene/1-hexene, and ethylene/1-octene copolymers are shown to require blending with LDPE to provide film materials with adequate shrink properties (especially in the cross direction) when processed via simple blown film extrusion.

In providing film materials with improved toughness and abuse or implosion resistance characteristics for shrink packaging, good low temperature heat-shrink performance in both the machine and cross directions must also be provided. Also, for shrink and skin packages void of excessive curl or warpage, shrink tension must be maintained at a low level, and to achieve the desired free shrink characteristics, the film material must possess the morphology and be strong enough to withstand the physical biaxial stretching that occurs during film fabrication in the simple blown film (bubble) extrusion process or in more elaborate processes such as the double bubble process described by Pahlke in U.S. Pat. No. 3,555, 604, the disclosure of which is incorporated herein by reference. Improved film materials must also exhibit good processability and optical properties relative to known film materials, and particularly, relative to the very low density polyethylene (VLDPE) materials and films disclosed by Lustig et al. in U.S. Pat. Nos. 5,059,481; 4,863,769; and 4,976,898.

Mitsui Petrochemical has been selling products prepared by polymerizing ethylene and a higher α-olefin under the trademark "Tafmer™" for more than a decade that are considered to be a class of very low modulus VLDPE materials. Some of the Tafmer™ grades have been marketed for use in multilayer film packaging structures. For example, U.S. Pat. No. 4,429,079 (Shibata et al.) assigned to Mitsui Petrochemical Industries, the disclosure of which is incorporated herein by reference, discloses a composition in which a random ethylene copolymer (conventional LLDPE having one, two or more melting points from 115° C. to 130° C. labeled as component (A) is blended with another random ethylene copolymer (one having a single melting point from 40° C. to 100° C.), labeled as component (B) to provide compositions where component (B) does not exceed 60 percent by weight of the total composition with improved properties, in particular, improved low-temperature heat sealability and flexural toughness for resisting pinhole formation during handling. However, with improved heat sealability and flexibility notwithstanding, Tafmer™ products are not generally recognized or marketed as having excellent abuse resistance properties and shrink characteristics. The Tafmer™ products having a single melting point are homogeneously branched linear polyethylenes which were earlier described by Elston in U.S. Pat. No. 3,645,992 and are made by a related polymerization process using vanadium catalysts.

Exxon Chemical Company has recently introduced products similar to Mitsui Petrochemical's Tafmer™ products which Exxon prepared by polymerizing ethylene and an α-olefin (e.g., 1-butene) in the presence of a single site metallocene catalyst. In a paper presented on Sep. 22-27, 1991 at the 1991 IEEE Power Engineering Society Transmission and Distribution Conference ("New Specialty Linear Polymers (SLP) For Power Cables", printed in the proceedings on pp, 184-190) in Dallas, Tex., Monica Hendewerk and Lawrence Spenadel, of Exxon Chemical Company, reported that Exxon's Exact™ polyolefins polymers, said to be produced using single site metallocene catalyst technology, are useful in wire and cable coating applications. Also, in the 1991 Polymers, Laminations & Coatings Conference Proceedings, pp. 289-296 ("A New Family of Linear Ethylene Polymers Provides Enhanced Sealing Performance" by Dirk G. F, Van der Sanden and Richard W. Halle, (also published in February 1992 TAPPI Journal)), and in ANTFEC '92 Proceedings, pp. 154-158 ("Exact™ Linear Ethylene Polymers for Enhanced Sealing Performance" by D. Van der Sanden and R. W. Halle), Exxon Chemical describe their new narrow molecular weight distribution polymers made using a single site metallocene catalyst as "linear backbone resins containing no functional or long chain branches." Films made from the polymers produced by Exxon are also said to have advantages in sealing characteristics as measured by hot-tack and heat-seal curves, but these publications do not discuss shrink characteristics. The new Exxon polymers are said to be linear and to have narrow molecular weight distributions, and, because of the narrow molecular weight distribution, are also said to have "the potential for melt fracture." Exxon Chemical acknowledged that "it is well known that narrow-MWD polymers are somewhat more difficult to process".

Accordingly, although many compositions are employed for film applications such as flexible packaging, or wrapping purposes, the need still exists for cast or blown multilayer films having an appropriate balance of properties. Such properties include, for example stretch, tear, cling, processability, impact resistance, elasticity, puncture, tensile, as well as, recovery, shrink characteristics, vacuum drawability abuse or implosion resistance. It would be advantageous if such films could be made having total thicknesses of from about 10 to about 50 microns. It would further be advantageous if such films were capable of efficiently unwinding with low noise levels.

The invention relates to improved multilayer films having a total thickness of from about 10 to about 50 microns. The multilayer films a number of compositions suitable for film structures. In one aspect the invention relates to a multilayer film having a total thickness of from about 10 to about 50 microns wherein said film comprises at least five layers and wherein at least one inner layer comprises a polypropylene-ethylene interpolymer. In yet another aspect the invention relates to a multilayer film comprising a cling layer, a core layer, and a release layer wherein said release layer comprises a polymer selected from the group consisting of low density polyethylene, polypropylene-ethylene interpolymer, and combinations thereof.

DETAILED DESCRIPTION OF THE INVENTION

General Definitions

Figure 1:
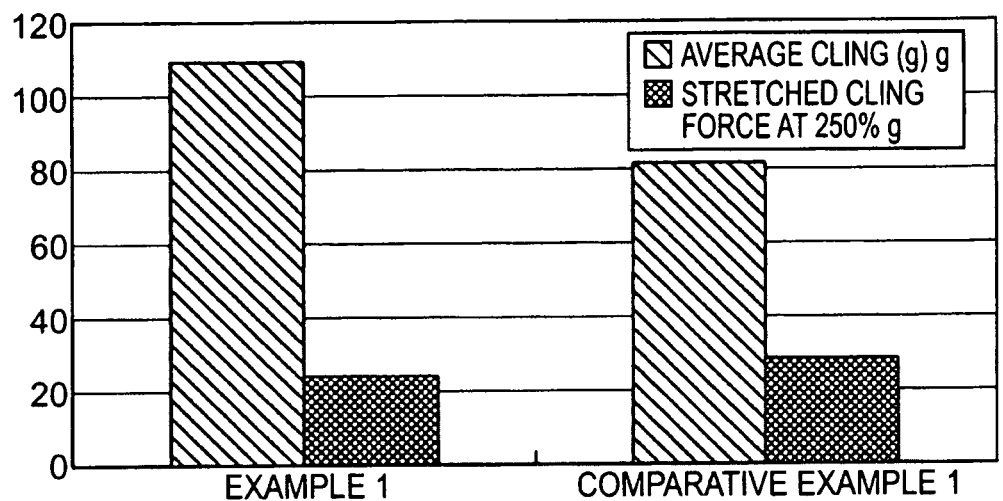
FIG. 1 is a plot showing the cling performance of Example 1 and Comparative Example 1.
Figure 2:
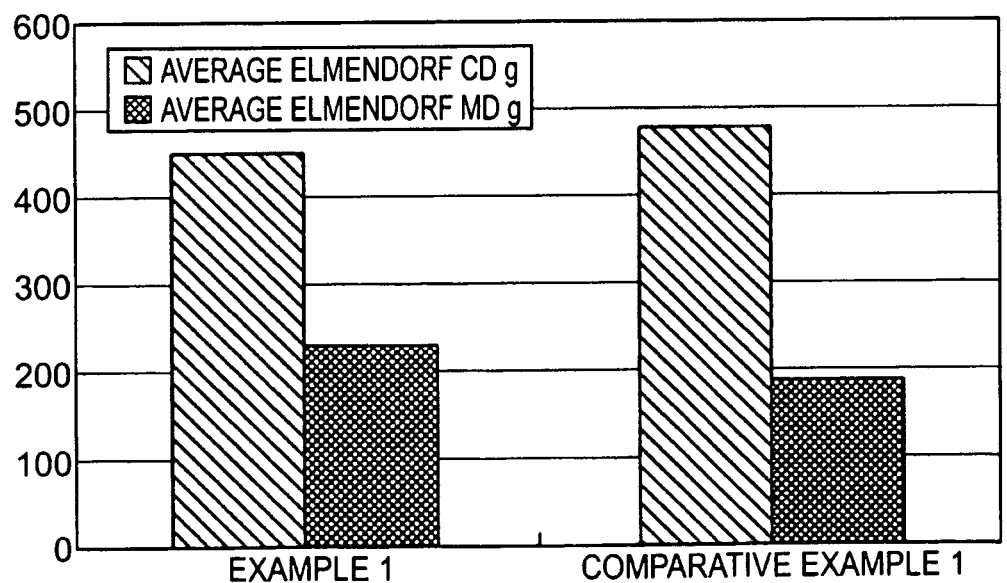
FIG. 2 is a plot showing the Elmendorf tear resistance of Example 1 and Comparative Example 1.
Figure 3:
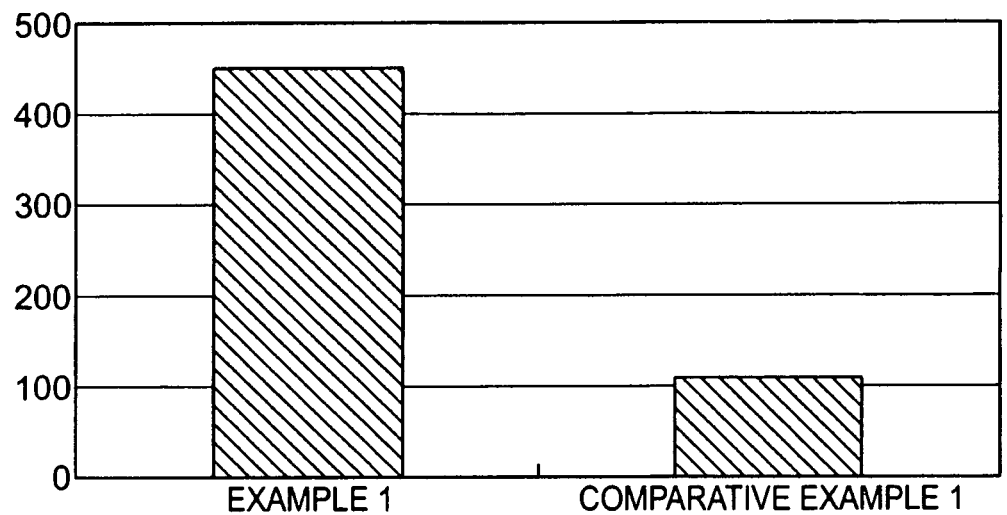
FIG. 3 is a plot showing the Dart drop resistance of Example 1 and Comparative Example 1.
Figure 4:
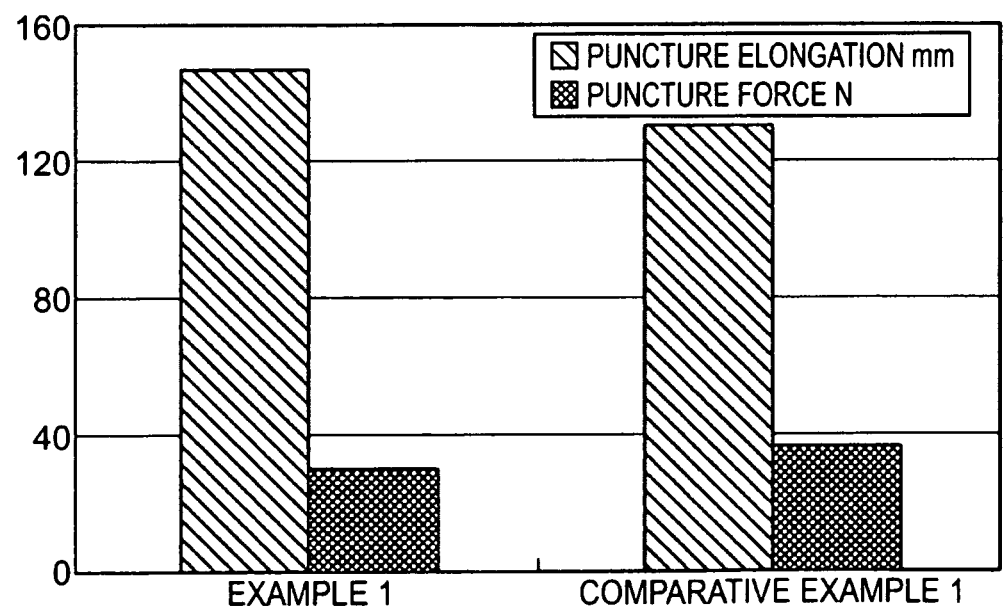
FIG. 4 is a plot showing the puncture elongation and puncture force of Example 1 and Comparative Example 1.
Figure 5:
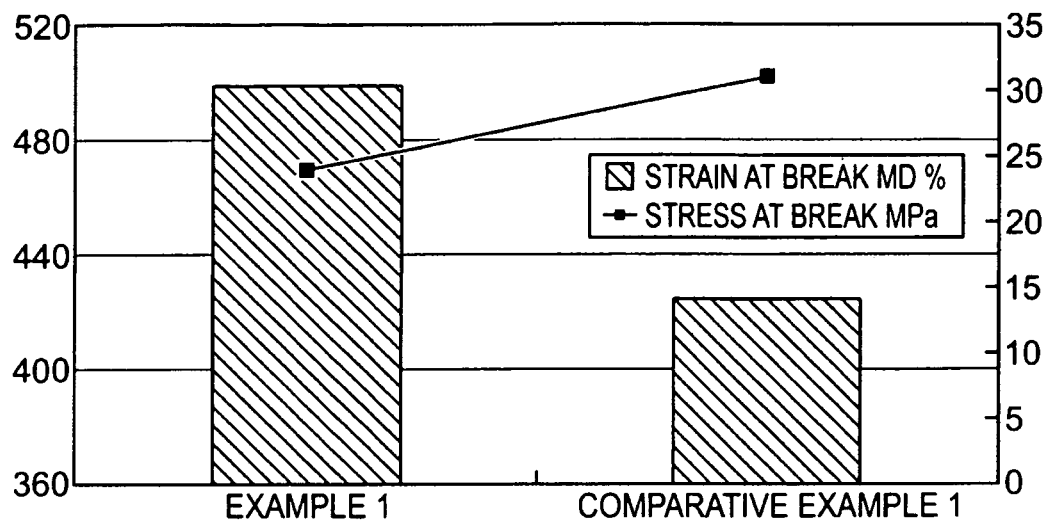
FIG. 5 is a plot showing the tensile properties of Example 1 and Comparative Example 1.
Figure 6:
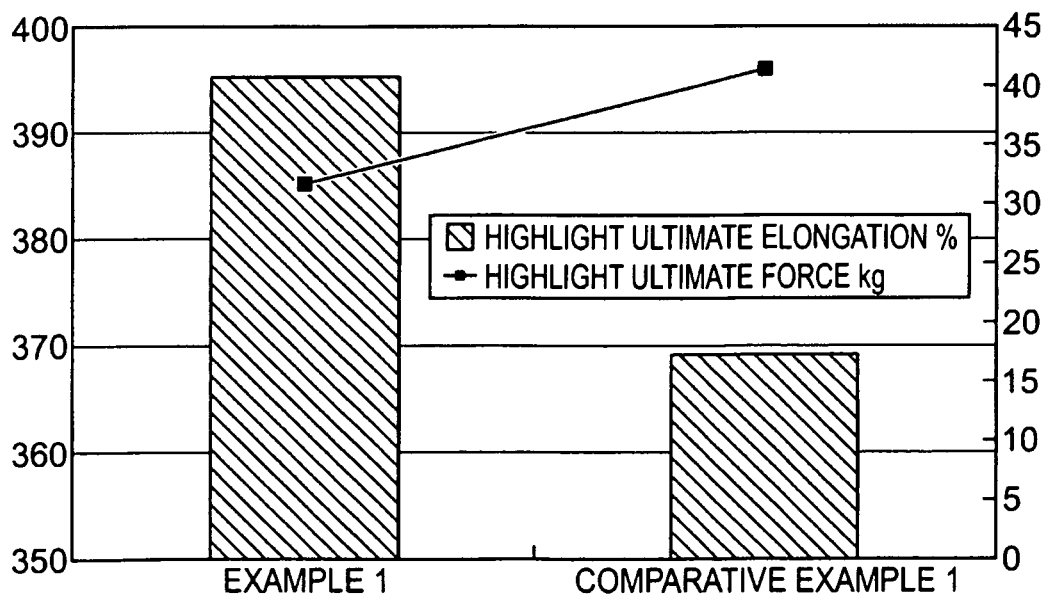
FIG. 6 is a plot showing the stretch performance of Example 1 and Comparative Example 1.
Figure 7:
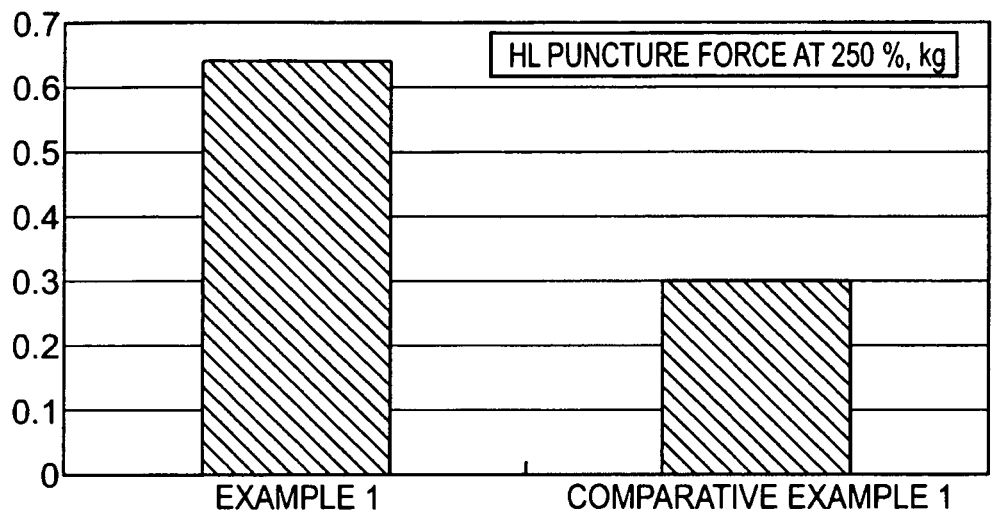
FIG. 7 is a plot showing the puncture force at 250% of Example 1 and Comparative Example 1.
Figure 8:
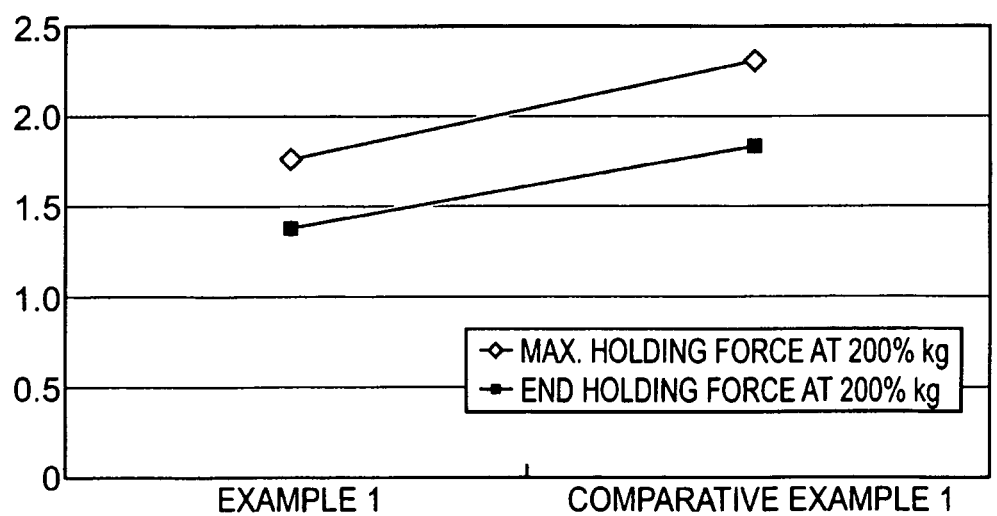
FIG. 8 is a plot showing the holding force of Example 1 and Comparative Example 1.

"Polymer" means a polymeric compound prepared by polymerizing monomers, whether of the same or a different type. The generic term "polymer" embraces the terms "homopolymer," "copolymer" "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin block interpolymer" generally refers to block copolymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 15' preferably from about 15 to about 20 mole percent of the whole polymer. In some embodiments, the ethylene/α-olefin block interpolymers do not include those produced in low yields or in a minor amount or as a by-product of a chemical process. While the ethylene/α-olefin block interpolymers can be blended with one or more polymers, the as-produced ethylene/α-olefin block interpolymers are substantially pure and often comprise a major component of the reaction product of a polymerization process. Such ethylene/α-olefin block interpolymers are described in, for example, U.S. Patent Application Publication No. US 2006/0199930 A1 published on Sep. 7, 2006 and incorporated herein by reference.

The terms "propylene-ethylene interpolymer" or "propylene based plastomers or elastomers (PBPE)" generally refer to copolymers comprising propylene and a monomer such as ethylene. Preferably, propylene comprises the majority mole fraction of the whole polymer, i.e., propylene comprises at least about 70, preferably at least about 80, more preferably at least about 90 mole percent of the whole polymer with a substantial remainder of the whole polymer comprising at least one other comonomer that is preferably ethylene. Suitable propylene-ethylene interpolymers are described in, for example, WO 2006/115839 published on Nov. 2, 2006 and incorporated herein by reference. Suitable propylene-ethylene interpolymers are sold commercially by The Dow Chemical Company as VERSIFY™ and by Exxon as VISTAMAXX™.

Unless otherwise stated, for purposes of this application the test methods used are summarized in Table 1 and the text following Table 1. A film thickness of 23 microns was used in the tests of Examples and Comparative Examples 1-3 while a film thickness of 25 microns was used in the tests of Comparative Example 4 and Examples 4A-I.

TABLE 1

Testing Methods

| Test | Method |
|---|---|
| Dart Drop Impact (DDI) | ISO 7765-1, Method A |
| Tensile (strain at break and stress at break) | ISO 527-3 (150 mm × 15 mm test specimen and speed of 500 mm/min.) |
| Puncture Resistance | ASTMD D 5748 |
| Average Cling | ASTM D 5458 |
| Elmendorf Tear | ASTM D-1922 |
| Ultimate elongation | Dow Method, Highlight tester[1] |
| Ultimate force | Dow Method, Highlight tester[1] |
| Holding force at 200% | Dow Method, Highlight tester[1] |
| Stretched cling force at 250% | Dow Method, Highlight tester[1] |
| Puncture force at 250% | Dow Method, Highlight tester[1] |

Figure 11:
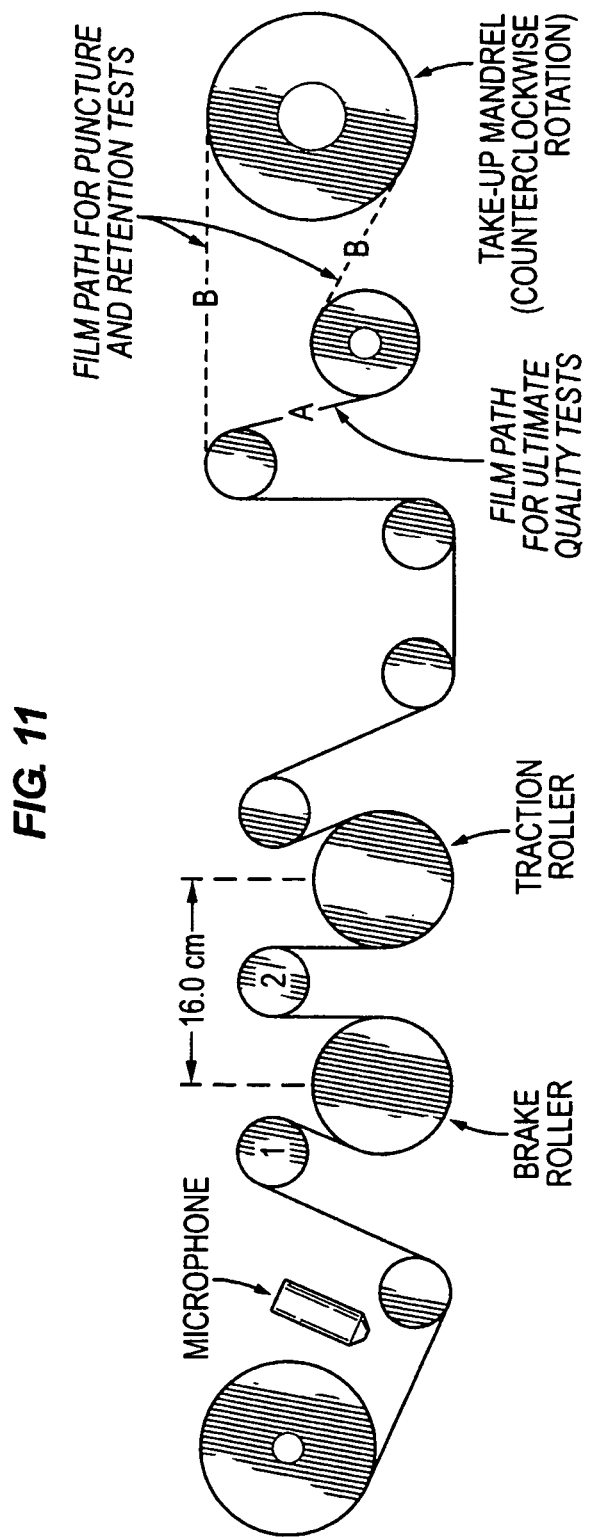
FIG. 11 is a film path diagram.

[1]Tests derived from the standard ASTM D 5458 using the equipment of FIG. 11.

Density

Resin density was measured by the Archimedes displacement method, ASTM D 792-03, Method B, in isopropanol. Specimens were measured within 1 hour of molding after conditioning in the isopropanol bath at 23° C. for 8 min to achieve thermal equilibrium prior to measurement. The specimens were compression molded according to ASTM D-4703-00 Annex A with a 5 min initial heating period at about 190° C. and a 15° C./min cooling rate per Procedure C. The specimen was cooled to 45° C. in the press with continued cooling until "cool to the touch".

Melt Flow Rate by Extrusion Plastomer

Melt flow rate measurements for polyethylene were performed according to ASTM D-1238-03, Condition 190° C./2.16 kg and Condition 190° C./10.0 kg, which are known as $I_2$ and $I_{10}$, respectively. Melt flow rate measurements for PBPE and/or propylene polymers were performed according to ASTM D-1238-03, Condition 230° C., 12.16 kg and Condition 230° C./10.0 kg, which are known as $I_2$ and $I_{10}$, respectively. Melt flow rate is inversely proportional to the molecular weight of the polymer. Thus, the higher the molecular weight, the lower the melt flow rate, although the relationship is not linear. Melt flow rate determinations can also be performed with even higher weights, such as in accordance with ASTM D-1238 Condition 190° C./21.6 kg, and is known as $I_{21}$. Melt Flow Rate Ratio (MFRR) is the ratio of melt flow rate ($I_{10}$) to melt flow rate ($I_2$) unless otherwise specified.

Procedure to Measure Unwinding Noise Level and Other Parameters (Dow method, Highlight Tester)

The test is done with the equipment shown in FIG. 11 which is industrial scale wrapper equipment obtained from Highlight Industries (Highlight Tester). The tests consist of stretching a 500 mm wide 23-25 micron thick single-sided cling film at a target elongation (pre-set stretch) of 200%. The stretching takes place between the Brake roller and a Traction roller that are separated so that the stretching of the film takes place over a 16.0 cm distance. Stretch film is obtained by running the traction roller at a higher rpm than the brake roller. The machine measures sequentially, each second, stretching force and noise level. The film unwinding speed is 110 meters per minute and the noise levels are measured with a microphone located tangentially to the film roll at 10 cm from the film roll. The background environmental noise is 45 dB. The Noise meter utilized is a QUEST TECHNOLOGIES, Model 2700. Unwinding force is measured with a load cell placed on the roller #1. Stretch force is measured with a load cell placed on roller #2.

As stated in Table 1, the Highlight testing equipment of FIG. 11 is also employed to measure, for example, ultimate elongation, ultimate force, holding force at 200%, stretched cling force at 250%, and puncture force at 250%. The following equipment is employed for the unwinding noise level and the aforementioned tests: Highlight Machine, Blade, PC Hewlett Packard, model Colorado T1000, European Highlight Software, Hewlett Packard DeskJet 879 Cse Printer, Tachometer, and Load Cell (OMEGA). The following procedures are generally employed:

The film is loaded by first determining which of the two sides has more cling. The spool of film is placed such at the cling-side rolls against the first idler roller as shown in FIG. 11. There are two ways to load film in the mandrel: 1) Use the button SUPPLY ROLL RAS/LWR on the console to lower the mandrel into a horizontal position. Position the film on the mandrel. Button SUPPLY ROLL RAS/LWR. 2) Leave the mandrel in vertical and carefully place the spool of film on it. Make sure that the core is positioned in the lower part against the base retainer. Make sure that the film completely covers the TABS instead of being positioned on the route going down to the base retainer, or the measurements will be imprecise. The TABS trap the cardboard tube in place. Fully open the safety gates. Feed three feet of film from the spool and make a strip. Follow the FILM PATH DIAGRAM for the required test as shown in FIG. 11. Once the film has been wound by the Pre-Stretch System, close the left safety gate. Use the foot switch to rotate the take-up mandrel in a counter clockwise direction until the film is fully threaded according to the pre-stretch system. Close the right safety gate. Carry out the desired test and collect the data.

DSC Glass Transition Temperature

Using a DSC TA Instruments model 2010, data was collected and reduced using Universal Analysis software package. Circa 9-mg sample was weight using a Mettler AE 240 analytical balance. Lightweight (ca 25 mg) aluminum pans were employed throughout. The pans were crimped to improve sample/pan contact. The below steps were employed;

Equilibrate at 40° C.
Ramp 10.00° C./min to 250.00° C.
Air cool: on
Ramp 20.00° C./min to 40.00° C.
Equilibrate at 40.00° C.
Air cool: Off
Ramp 10.00° C./min to 250.00° C.
Data storage: Off
Air cool: On
Ramp 20.00° C./min to 30.00° C.
Air cool: Off Multilayer Films Comprising Five or More Layers It has been discovered that a particularly preferable multilayer film is one that has a total thickness of at least about 10, preferably at least about 20, to at most about 50, preferably at most about 30 microns. It is preferable that the multilayer film comprises at least five layers wherein at least one inner layer comprises a polypropylene-ethylene interpolymer. If elasticity is desired, then it is preferable that the innermost layer comprise the polypropylene-ethylene interpolymer. By innermost layer is meant an inner layer that has approximately the same number of layers on each side or has nearly the same thickness of film on each side. For example, if said film has five layers then it is preferable that the $3^{rd}$ layer comprise the polypropylene-ethylene interpolymer assuming the sum of the thickness of layers 1 and 2 is similar to the sum of thickness of layers 4 and 5. Should, for example, the thickness of layer 1 be more similar to the sum of layers 3, 4, and 5 then it may be preferable that layer 2 comprise the polypropylene-ethylene interpolymer.

The specific propylene-ethylene polymer employed in an inner layer is not particularly critical and may vary depending upon the other components, as well as, desired properties and desired processing characteristics. Typically, the density of the polypropylene-ethylene interpolymer is at least about 0.80, preferably at least about 0.84 g/cm$^3$, to about 0.90 g/cm$^3$, preferably up to about 0.89 g/cm$^3$ according to ASTM D-792. For processing ease the DSC glass transition temperature of the polypropylene-ethylene interpolymer is usually less than about −20° C. while the total crystallinity of the polypropylene-ethylene interpolymer is often less than about 20%. The melt flow rate of the polypropylene-ethylene interpolymer is usually from about 1, preferably from about 5 to at most about 30, preferably at most about 10 according to ASTM D1238 230° C./2.16 kg.

The amount of the polypropylene-ethylene interpolymer of an inner layer varies depending upon its properties and other components. In general, the amount of polypropylene-ethylene interpolymer of an inner layer may vary from 0 to 100 percent by weight based on the weight of the inner layer. Typically, the amount of polypropylene-ethylene interpolymer of an inner layer is from at least about 30, preferably at least about 50, more preferably at least about 70 weight percent of said inner layer. The polypropylene-ethylene interpolymer, when present, may be used alone in the inner layer or in combination with other components. Suitable other components include, for example, a second polymer or more selected from the group consisting of, for example, polyolefins, polystyrene, polyesters, polycarbonates, polyamides and combinations thereof. In particular, polyethylene, polypropylene, polybutadiene, and combinations thereof may be employed. Particularly desirable polyethylenes include linear very low density polyethylene, linear low density polyethylene, and linear medium density polyethylene.

The components of the other inner layers and outer layers may comprise components such as those of the aforementioned inner layer. Preferably, the other inner layers and the outer layers comprise a polymer selected from the group consisting of linear very low density polyethylene, linear low density polyethylene, linear medium density polyethylene, polypropylene-ethylene interpolymer, and combinations thereof.

The number of layers and thickness of each layer may vary depending upon the materials and equipment employed and the desired properties of the multilayer film. Preferably, for films having an inner layer comprising the polypropylene-ethylene interpolymer, said inner layer comprises from about 10 to 50 percent of the total film thickness. For said films each of the two outer layers preferably comprises from about 10 to 20 percent of the total film thickness while the other inner layers of said film comprise from about 20 to 30 percent of the total film thickness.

Multilayer cast, stretch films comprising a total thickness of from about 10 to about 50 microns and comprising at least five layers wherein at least one inner layer comprises a polypropylene-ethylene interpolymer have desirable properties. For example, the average cling of such films can be greater than about 80 g according to ASTM D5458. Surprisingly, the Dart drop impact resistance may be greater than about 150 g according to ISO 7765-1 while the strain at break and ultimate elongation may be greater than about 440% according to ISO 527-3/2000. In some cases, cast stretch multilayer films may have a puncture resistance at 250% of greater than about 0.4 kg according to ASTM D-5748.

As described above, multilayer films having more than five layers may be made without including a polypropylene-ethylene interpolymer in an inner layer. In such situations (and even if a polypropylene-ethylene interpolymer is employed in an inner layer) it may be desirable to make a film that comprises more than five layers, e.g., at least about 6, preferably at least about 10, more preferably at least about 20 layers, up to at about 2000, preferably up to about 1000, more preferably up to about 100 layers. In such situations it is preferable that the film has a total thickness of at least about 10, preferably at least about 20, to at most about 50, preferably at most about 30 microns and most preferably a total thickness of from about 17 to about 30 microns. To make such films it may be desirable to employ the processes and equipment described in, for example, U.S. Pat. No. 5,094,793 issued Mar. 10, 1992 and U.S. Pat. No. 5,628,950 issued May 13, 1997, as well as, U.S. Pat. Nos. 5,202,074; 5,380,479; and 5,540,878.

If high tear strength and/or stretch is desired then it is also preferable that the multilayer film comprise a thermoplastic such as a polyolefin like linear low density polyethylene in at least one or more layers. Alternatively or in addition, each of the layers may comprise a polymer selected from the group consisting of polyolefins, polystyrene, polyesters, polycarbonates, polyamides and combinations thereof. Particularly preferred polymers for each layer include, for example, polyethylene, polypropylene, polybutadiene, linear very low density polyethylene, linear medium density polyethylene, polypropylene-ethylene interpolymer and combinations thereof.

A particularly preferred multilayer film comprises from about 10 to about 100 layers comprising the same polymer or polymer blend in each layer. It has been found that such multilayer films may have a stretch of at least 5, preferably at least 10, more preferably at least 20 percent greater according to Dow method, Highlight tester (as described above) than a comparable three layer film having the same total thickness and same composition in each layer as said multilayer film. Similarly, said preferred multilayer film may exhibit an Elmendorf tear strength in the cross-direction of at least 10, preferably at least 20 percent greater than a comparable three layer film having substantially the same total thickness and composition in each layer as said multilayer film. In yet another embodiment said preferred multilayer film may also exhibit puncture resistance of at least about 5, preferably at least about 10 percent greater than a comparable three layer film having substantially the same total thickness and composition in each layer as said multilayer film. In yet another embodiment said preferred multilayer film may also exhibit a strain at break and/or strain at tensile strength of at least about 2.5, preferably at least about 5 percent greater than a comparable three layer film having substantially the same total thickness and composition in each layer as said multilayer film.

Multi-Layer Blown Films Comprising a Cling, Core, and Release Layer

For applications such as silage film, it is important to obtain good cling and toughness with low noise levels during unwinding. In this regard a multilayer film has been discovered which comprises a cling layer, a core layer, and a release layer. Said multilayer films preferably have a total thickness of from about 10 to about 50 microns and more preferably a total thickness of from about 15 to about 35 microns. Preferably, the cling layer comprises from about 10 to about 30 percent of the total film thickness, said core layer comprises from about 40 to about 80 percent of the total film thickness, and said release layer comprises from 10 to about 30 percent of the total film thickness. For optimum processing and reduced noise levels during unwinding it is preferred that the film be substantially free, i.e., contain from about 0 to less than about 10, preferably less than about 5, more preferably less than about 1 percent by weight, of polyisobutylene. The inventive three layer film is often capable of exhibiting an average cling of greater than about 240 g according to ASTM D 5458.

It is preferable that the release layer comprise a polymer selected from the group consisting of low density polyethylene, polypropylene-ethylene interpolymer, and combinations thereof. The release layer optionally further comprises a hydrophilizing additive. Should a polypropylene-ethylene interpolymer be employed in the release layer it preferably has a density of from about 0.85 g/cm$^3$ to 0.91 g/cm$^3$, more preferably from about 0.875 g/cm$^3$ to about 0.90 g/cm$^3$ according to ASTM D-792. Said polypropylene-ethylene interpolymer also preferably has a DSC glass transition temperature of less than about −10° C. and/or a total crystallinity of less than about 60%. It is also often preferable for both processing and for film properties that the melt flow rate of the polypropylene-ethylene interpolymer be from about 1 to about 30, preferably from about 0.5 to about 5 according to ASTM D1238 230° C./2.16 kg.

The cling layer of the multilayer film comprising a cling, core, and release layer preferably comprises a polyethylene. Such polyethylenes of the cling layer preferably comprise a polyethylene having a density of from about 0.85 g/cm$^3$ to about 0.91 g/cm$^3$ according to ASTM D-792, an ethylene/α-olefin block interpolymer, ethylene-vinyl acetate copolymer and/or a combination thereof. The cling layer optionally further comprises a hydrophilizing additive.

The core layer of the multilayer film multilayer film comprising a cling, core, and release layer preferably comprises a linear low density polyethylene.

Useful Additives

Additives such as antioxidants (e.g., hindered phenolics (such as Irganox® 1010 or Irganox® 1076), phosphites (e.g., Irgafos® 168 all trademarks of Ciba Geigy), cling additives (e.g., PIB), PEPQ™ (a trademark of Sandoz Chemical, the primary ingredient of which is believed to be a biphenylphosphonite), pigments, colorants, fillers, and the like can also be included in the interpolymers and copolymers, to the extent that they do not interfere with the desired properties. The fabricated film may also contain additives to enhance its antiblocking and coefficient of friction characteristics including, but not limited to, untreated and treated silicon dioxide, talc, calcium carbonate, and clay, as well as primary and secondary fatty acid amides, silicone coatings, etc. Other additives to enhance the film's anti-fogging characteristics may also be added, as described, for example, in U.S. Pat. No. 4,486,552 (Niemann), the disclosure of which is incorporated herein by reference. Still other additives, such as quaternary ammonium compounds alone or in combination with EAA or other functional polymers, may also be added to enhance the film's antistatic characteristics and allow packaging of electronically sensitive goods.

A particularly preferred additive for cling and/or release layers for many applications may be a hydrophilizing additive such as a polyhydric polyols, polyethers and mixtures thereof. For example, various Irgasurf™ products available from Ciba Specialty Chemicals is often suitable. Irgasurf or Unithox (Baker Petrolite) are a polyethylene/polyethylene glycol/block co-polymers. Such hydrophilizing additives may be added in a hydrophilizing amount. Such amounts vary depending upon the specific composition and film structure but are often from about 0.1 to about 3, preferably from about 0.5 to about 2, and more preferably from about 0.75 to about 1.5 weight percent based on the weight of the polymer in the film layer. It has surprisingly and unexpectedly been found that a hydrophilizing additive added in a hydrophilizing amount may be beneficial in reducing noise levels during film unwinding.

Crosslinking

In regard to crosslinking, film structures that include ethylene/α-olefin block interpolymers may show surprisingly more efficient irradiation crosslinking as compared to a comparative conventional Ziegler polymerized linear ethylene/α-olefin polymer. By taking advantage of the irradiation efficiency, it is possible to prepare film structures with differentially or selectively crosslinked film layers. To take further advantage of this discovery, specific film layer materials including the present ethylene/α-olefin block interpolymers can be formulated with pro-rad agents, such as triallyl cyanurate as described by Warren in U.S. Pat. No. 4,957,790, and/or with antioxidant crosslink inhibitors, such as butylated hydroxytoluene as described by Evert et al. in U.S. Pat. No. 5,055,328.

Irradiation crosslinking is also useful for increasing the shrink temperature range and the heat seal range for the film structures. For example, U.S. Pat. No. 5,089,321, incorporated herein by reference, discloses multilayer film structures comprising at least one heat sealable outer layer and at least one core layer which have good irradiation crosslinking performance. Among irradiation crosslinking technologies, beta irradiation by electron beam sources and gamma irradiation by a radioactive element such as Cobalt 60 are the most common methods of crosslinking film materials.

In an irradiation crosslinking process, a thermoplastic film is fabricated by a blown film process and then exposed to an irradiation source (beta or gamma) at an irradiation dose of up to 20 Mrad to crosslink the polymeric film. Irradiation crosslinking can be induced before or after final film orientation whenever oriented films are desired such as for shrink and skin packaging, however, preferably irradiation crosslinking is induced before final orientation. When heat-shrinkable and skin packaging films are prepared by a process where pellet or film irradiation precedes final film orientation, the films invariably show higher shrink tension and will tend yield higher package warpage and board curl; conversely, when orientation precedes irradiation, the resultant films will show lower shrink tension. Unlike shrink tension, the free shrink properties of the ethylene/α-olefin multi-block interpolymers of the present invention are believed to be essentially unaffected by whether irradiation precedes or follows final film orientation.

Irradiation techniques useful for treating the film structures described herein include techniques known to those skilled in the art. Preferably, the irradiation is accomplished by using an electron beam (beta) irradiation device at a dosage level of from about 0.5 megarad (Mrad) to about 20 Mrad. Shrink film structures fabricated from, for example, the ethylene/α-olefin multi-block interpolymers also may exhibit improved physical properties due to a lower degree of chain scission occurring as a consequence of the irradiation treatment.

Blending Polymers for a Given Layer

As stated above, each layer may comprise one or more polymers. If a composition comprising two or more polymers are employed in the inner layer (or in any layer for that matter), then the compositions can be formed by any convenient method. For example, the blends may be prepared by mixing or kneading the respective components at a temperature around or above the melt point temperature of one or more of the components. Typical polymer mixing or kneading equipment that is capable of reaching the desired temperatures and melt plastifying the mixture may be employed. These include mills, kneaders, extruders (both single screw and twin-screw), Danbury mixers, calenders and the like. The sequence of mixing and method may depend on the final composition. A combination of Banbury batch mixers and continuous mixers may also be employed, such as a Banbury mixer followed by a mill mixer followed by an extruder.

Another method of forming blended compositions comprises in-situ polymerization as disclosed in U.S. Pat. No. 5,844,045 in the names of Brian W. S. Kolthammer and Robert S. Cardwell, the disclosure of which is incorporated herein in its entirety by reference. U.S. Pat. No. 5,844,045 describes inter alia, interpolymerizations of ethylene and $C_3$-$C_{20}$ alpha-olefins using at least one homogeneous catalyst in at least one reactor and at least one heterogeneous catalyst in at least one other reactor. The multiple reactors can be operated in series or in parallel or any combination thereof, with at least one reactor employed to make an ethylene/α-olefin multi-block interpolymer as described above. In this manner, blends may be made in solution processes comprising constrained geometry catalysts, Ziegler catalysts, and combinations thereof. Such blends comprise, for example, one or more ethylene/α-olefin multi-block interpolymers (as described above and in PCT/US2005/008917 filed Mar. 17, 2004), one or more polymers of broad molecular weight distribution (e.g. heterogeneously branched ethylene polymers as described in, for example, U.S. Pat. No. 5,847,053), and/or one or more polymers of narrow molecular weight distribution (e.g., homogeneous polymers as described in U.S. Pat. No. 3,645,992 (Elston) or U.S. Pat. No. 5,272,236).

In-situ polymerization using solution polymerization reactors in series may be particularly preferable when making blends that comprise at least one high molecular weight polymer of narrow molecular weight distribution and at least one polymer of broad molecular weight distribution made with a Ziegler catalyst. This is because it often requires substantial solvent to make high molecular weight polymer while the use of Ziegler catalysts often requires higher temperatures than homogeneous catalysts. Thus, the use of higher temperatures with the Ziegler catalyst in a subsequent reactor will facilitate excess solvent evaporation. In addition, another advantage to using series solution reactors to make the products of the invention is that an extremely high molecular weight product (e.g., $I_2$ of 0.05 g/10 minutes or less) can be made and incorporated into the finished product, even though that extremely high molecular weight product often could not physically be isolated without catastrophic reactor fouling. So for those "blends" incorporating a very high molecular weight component, a discrete or physical blend is often not even possible, since the first component could not be isolated.

Manufacturing the Multilayer Films

The aforementioned multilayer films may be prepared by any suitable method. For cast, stretch films a particularly preferable method is to employ a high output, high speed cast extrusion line using multiple extruders. The processing conditions will, of course, depend upon the materials employed, the processing equipment, and the desired film and properties.

The multilayer films of the present invention can also be made using conventional simple blown film (bubble) or cast extrusion techniques as well as by using more elaborate techniques such as "tenter framing" or the "double bubble" or "trapped bubble" process.

"Stretched" and "oriented" are used in the art and herein interchangeably, although orientation is actually the consequence of a film being stretched by, for example, internal air pressure pushing on the tube or by a tenter frame pulling on the edges of the film.

Simple blown film (bubble) processes are described, for example, in The Encyclopedia of Chemical Technology, Kirk-Othmer, Third Edition, John Wiley & Sons, New York, 1981, Vol. 16, pp. 416-417 and Vol. 18, pp. 191-192, the disclosures of which are incorporated herein by reference. Processes for manufacturing biaxially oriented film such as the "double bubble" process described in U.S. Pat. No. 3,456,044 (Pahlke), and other suitable processes for preparing biaxially stretched or oriented film are described in U.S. Pat. No. 4,865,902 (Golike et al.), U.S. Pat. No. 4,352,849 (Mueller), U.S. Pat. No. 4,820,557 (Warren), U.S. Pat. No. 4,927,708 (Herran et al.), U.S. Pat. No. 4,963,419 (Lustig et al.), and U.S. Pat. No. 4,952,451 (Mueller), the disclosures of each of which are incorporated herein by reference. The film structures can also be made as described in a tenter-frame technique, such as that used for oriented polypropylene.

Other multi-layer film manufacturing techniques for food packaging applications are described in Packaging Foods With Plastics, by Wilmer A. Jenkins and James P. Harrington (1991), pp. 19-27, and in "Coextrusion Basics" by Thomas I. Butler, Film Extrusion Manual: Process, Materials, Properties pp. 1-80 (published by TAPPI Press (1992)) the disclosures of which are incorporated herein by reference.

As disclosed by Pahlke in U.S. Pat. No. 3,456,044 and in comparison to the simple bubble method "double bubble" or "trapped bubble" film processing can significantly increase a film's orientation in both the machine and transverse directions. The increased orientation yields higher free shrinkage values when the film is subsequently heated. Also, Pahlke in U.S. Pat. No. 3,456,044 and Lustig et al. in U.S. Pat. No. 5,059,481 (incorporated herein by reference) disclose that low density polyethylene and ultra low density polyethylene materials, respectively, exhibit poor machine and transverse shrink properties when fabricated by the simple blown film (bubble) method, e.g., about 3% free shrinkage in both directions. However, in contrast to known film materials, and particularly in contrast to those disclosed by Lustig et al. in U.S. Pat. Nos. 5,059,481; 4,976,898; and 4,863,769, as well as in contrast to those disclosed by Smith in U.S. Pat. No. 5,032,463 (the disclosures of which are incorporated herein by reference), the film compositions of the present invention may show improved simple blown film (bubble) shrink characteristics in both the machine and transverse directions. Additionally, when the unique interpolymers may be fabricated by simple blown film (bubble) method at high blow-up ratios, e.g., at greater or equal to 2.5:1, or, more preferably, by the "double bubble" method disclosed by Pahlke in U.S. Pat. No. 3,456,044 and by Lustig et al. in U.S. Pat. No. 4,976,898, it is possible to achieve good machine and transverse direction shrink characteristics making the resultant films suitable for shrink wrap packaging purposes. Blow-Up Ratio, abbreviated herein as "BUR", is calculated by the equation:

BUR=Bubble Diameter.div.Die Diameter.

The multilayer films can be laminated onto another layer(s) in a secondary operation, such as that described in Packaging Foods With Plastics, by Wilmer A. Jenkins and James P. Harrington (1991) or that described in "Coextrusion For Barrier Packaging" by W. J. Schrenk and C. R. Finch, Society of Plastics Engineers RETEC Proceedings, Jun. 15-17 (1981), pp. 211-229, the disclosure of which is incorporated herein by reference. If a monolayer film layer is produced via tubular film (i.e., blown film techniques) or flat die (i.e., cast film) as described by K. R. Osborn and W. A. Jenkins in "Plastic Films, Technology and Packaging Applications" (Technomic Publishing Co., Inc. (1992)), the disclosure of which is incorporated herein by reference, then the film must go through an additional post-extrusion step of adhesive or extrusion lamination to other packaging material layers to form a multilayer film. If the film is a coextrusion of two or more layers (also described by Osborn and Jenkins), the film may still be laminated to additional layers of packaging materials, depending on the other physical requirements of the final film. "Laminations Vs. Coextrusion" by D. Dumbleton (Converting Magazine (September 1992), the disclosure of which is incorporated herein by reference, also discusses lamination versus coextrusion. The multilayer films of the present invention can also go through other post extrusion techniques, such as a biaxial orientation process.

Extrusion coating is yet another technique for producing multilayer films. Similar to cast film, extrusion coating is a flat die technique. A sealant can be extrusion coated onto a substrate either in the form of a monolayer which is subjected to further processing or a coextruded extrudate.

The multilayer films described above may include additional layers that include but are not limited to barrier layers, and/or tie layers, and/or structural layers. Various materials can be used for these layers, with some of them being used as more than one layer in the same film structure. Some of these materials include: foil, nylon, ethylene/vinyl alcohol (EVOH) copolymers, polyvinylidene chloride (PVDC), polyethylene terephthalate (PET), oriented polypropylene (OPP), ethylene/vinyl acetate (EVA) copolymers, ethylene/acrylic add (EAA) copolymers, ethylene/methacrylic add (EMAA) copolymers, U LOPE, VLDPE, LLDPE, HDPE, LDPE, nylon, graft adhesive polymers (e.g., maleic anhydride grafted polyethylene), and paper.

The multilayer film structures can be made to be oxygen permeable either by using the ethylene/α-olefin block interpolymers alone in the film, or in combination with other oxygen permeable film layers such as, for example, ethylene/vinyl acetate (EVA) and or ethylene/acrylic acid (EAA). Of particular interest, for example, are ethylene/α-olefin block interpolymer/EAA/ethylene/α-olefin multi-block interpolymer and LLDPE/ethylene/α-olefin multi-block interpolymer/LLDPE film structures which may be replacements for PVC and well suited for stretch overwrapping various fresh foods, e.g. retail-cut red meats, fish, poultry, vegetables, fruits, cheeses, and other food products destined for retail display and that benefit from access to environmental oxygen or must appropriately respire. These films are preferably prepared as nonshrink films (e.g. without biaxial orientation induced by double bubble processing) with good oxygen permeability, stretchability, elastic recovery and heat seal characteristics, and can be made available to wholesalers and retailers in any conventional form, e.g. stock rolls, as well as be used on conventional packaging equipment.

In another aspect, the multilayer film structures can comprise an oxygen barrier film (e.g., SARAN™ a film made from a polyvinylidene chloride polymer made by The Dow Chemical Company, or EVAL™ resins which are ethylene/vinyl alcohol copolymers made by Eval Company of America, a division of Kuraray of America, Inc., a wholly owned subsidiary of Kuraray Ltd.). Oxygen barrier properties are important in film applications such as packaging primal cuts of meat (i.e. large cuts of meat which are shipped to a specific store for further cutting for specific consumer consumption). As described by Davis et al. in U.S. Pat. No. 4,886,690, the oxygen barrier layer can also be designed as "peelable" to allow removal once the packaged primal cut arrives at the butcher/grocer; a peelable construction or design is particularly useful for "case-ready" vacuum skin packages of individual portions and eliminates the need for repackaging to an oxygen permeable package for blooming to bright red.

The multilayer films of the present invention may also be pre-formed by any known method, such as, for example, by extrusion thermoforming, with respect to the shape and contours of the product to be packaged. The benefit of employing pre-formed film structures will be to complement or avoid a given particular of a packaging operation such as augment drawability, reduced film thickness for given draw requirement, reduced heat up and cycle time, etc.

As shown by the following examples, the multilayer films of the present invention often exhibit good properties or combination of properties such as average cling, stretched cling force at 250%, Elmendorf tear resistance, Dart drop resistance, puncture resistance MD tensile properties, ultimate elongation, puncture resistance, holding force, stretch, and Elmendorf tear. Further, the films may have, for example, less noise during unwinding.

EXAMPLES OF THE PRESENT INVENTION

Example 1

5 Layer Cast, Stretch Film

A five layer cast film having a total thickness of 23 microns was fabricated using a four extruder line (two extruders of 120 mm diameter screw, one extruder of 160 mm diameter screw, and one extruder of 90 mm diameter screw), using a melt temperature of 250° C., a die width of 4 m, die gap of 0.7 mm, a line speed of 560 m per minute, and an output of 3.4 MT per hour. The five layer film configuration was A/B/C/B/D wherein layer A comprises 10% of the total thickness and layer D comprises 15% of the total thickness and each of the two B layers and one C layer comprise 25% of the total thickness. The A layer comprised 100% by weight of a linear very low density ethylene-octene copolymer having a a density of 0.904 g/cm$^3$ and a melt flow rate of 4.0 g/10 min. The two B layers comprised 100% by weight of a linear low density ethylene-octene copolymer having a density of 0.918 g/cm$^3$ and melt flow rate of 3.4 g/10 min. The C layer comprised 100% by weight of a solution polypropylene-ethylene copolymer having a density of 0.8585 g/cm$^3$ and a melt flow rate of 8.0 g/10 min. The D layer comprised 100% by weight of a linear medium density ethylene-octene copolymer having a density of 0.935 g/cm$^3$ and a melt flow rate of 2.5 g/10 min.

Comparative Example 1

5 Layer Cast, Stretch Film

A five layer cast film was made according to the procedure of Example 1 above except that the C layer comprised 100% by weight of a linear low density ethylene-octene copolymer having a density of 0.918 g/cm$^3$ and melt flow rate of 3.4 g/10 min. instead of a solution polypropylene-ethylene copolymer having a density of 0.8585 g/cm$^3$ and a melt flow rate of 8.0 g/10 min. Thus, the film configuration was A/C/B/B/D wherein layer A comprises 110% of the total thickness and layer D comprises 10% of the total thickness and each of the three B layers comprise 35% of the total thickness.

Testing of Example 1 and Comparative Example 1

Example 1 and Comparative Example 1 were tested for average cling, stretched cling force at 250%, Elmendorf tear resistance, Dart drop resistance, puncture resistance, MD tensile properties, ultimate elongation, puncture resistance, and holding force using Test methods described earlier. The results in FIGS. 1-8 show that Example 1 comprising polypropylene-ethylene copolymer in an inner layer has surprising and unexpected improvement in a number of properties.

Example 2

32 Layer Cast, Stretch Film

A 32 layer cast film having a total thickness of 23 microns was fabricated using a four extruder line (three extruders of 33 mm diameter screw and one extruder of 25 mm diameter screw), using a melt temperature of 205° C., a die width of 30 cm, a die gap of 0.8 mm, a line speed of 18 m/min. and an output of 6 kg/hr. The 32 layer final cast film configuration was made by first making an A/B/C/B structure which was multiplied by 2 and then further multiplied by 4 to obtain the 32 layer final cast film. Useful multiplication techniques and equipment may be found in, for example, U.S. Pat. Nos. 5,094,793; 5,628,950; 5,202,074; 5,380,479; and 5,540,878. Layer A was made using the 25 mm diameter screw extruder and layers B. C, and B were made using the 33 mm diameter screw extruder. Each layer in the 32 layer cast film comprised 100% by weight of a linear low density ethylene-octene copolymer having a density of 0.92 g/cm$^3$, a melt index of 4.0 g/10 min. (190° C./2.16 kg, ASTM D1238), and a melt flow rate ratio ($I_{10}/I_2$) of 7.7 currently sold as Dowlex™ 2606 by The Dow Chemical Company.

Comparative Example 2

3 Layer Cast, Stretch Film

A 3 layer cast film having a total thickness of 23 microns was fabricated using a three extruder line (two extruders of 33 mm diameter screw and one extruder of 25 mm diameter screw) using a melt temperature of 205° C., a die width of 30, a die gap of 0.8 mm a line speed of 18 m/min, and an output of 6 kg/hr. The 3 layer film configuration was A/B/C. Layer A were made using the 25 mm diameter screw extruder and layers B, and C were made using the 33 mm diameter screw extruder. Each layer in the 3 layer cast film comprised 100% by weight of the same linear low density ethylene-octene copolymer as in Example 2.

Example 3

32 Layer Cast, Stretch Film

Example 2 was repeated except that an enhanced linear low density ethylene-octene copolymer having a density of 0.916 g/cm$^3$, a melt index of 4.0 g/10 min., and a melt flow rate ratio ($I_{10}/I_2$) of 6.9 currently sold as Elite 5230™ by The Dow Chemical Company was employed in place of the linear low density ethylene-octene copolymer used in Example 2

Comparative Example 3

32 Layer Cast, Stretch Film

Comparative Example 2 was repeated except that the enhanced linear low density ethylene-octene copolymer used in Example 3 (Elite 5230™) was employed in place of the Dowlex 2606™ used in comparative Example 2.

Testing of Examples 2-3 and Comparative Examples 2-3

Figure 9:
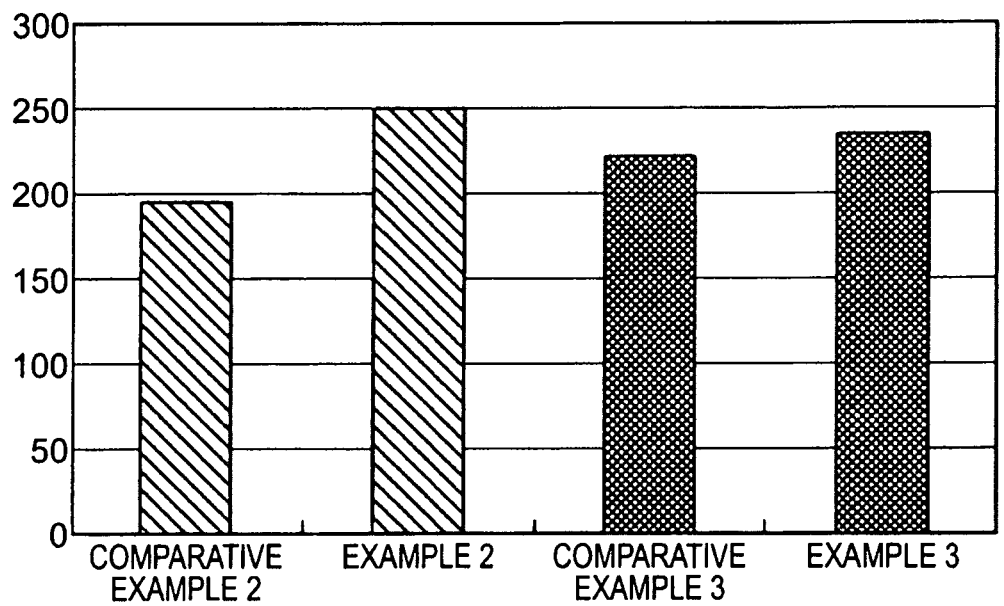
FIG. 9 is a plot showing the Dow method, Highlight tester stretch properties of Examples 2-3 and Comparative Examples 2-3.
Figure 10:
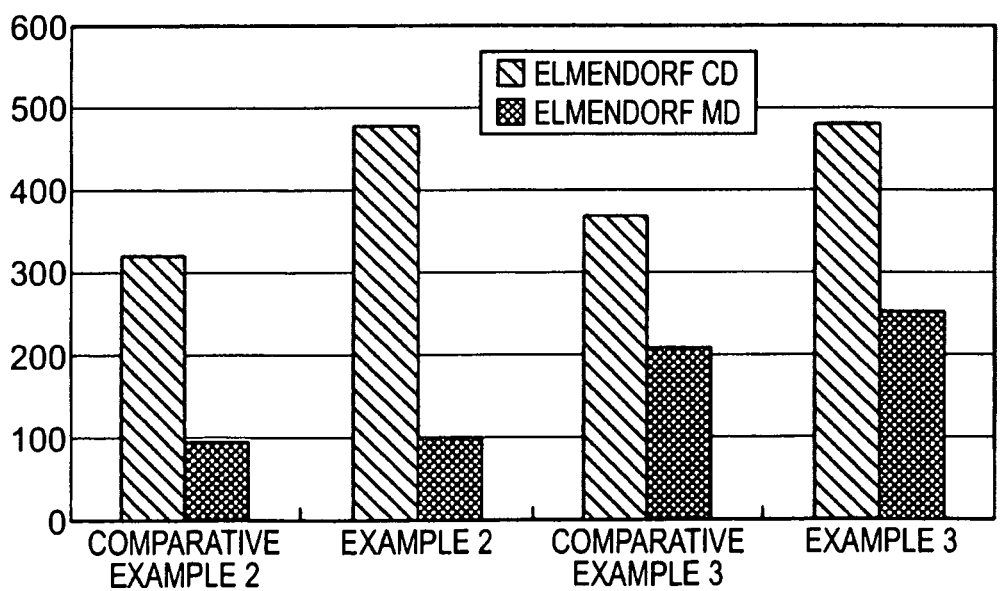
FIG. 10 is a plot showing the Elmendorf tear properties of Examples 2-3 and Comparative Examples 2-3.

Examples 2-3 and Comparative Examples 2-3 were tested for stretch, Elmendorf tear CD, and Elmendorf tear MD using Test Methods described earlier respectively. The results in FIGS. 9-10 show that even though the comparative films of comparative examples 2-3 are of the same thickness and same polymers as example 2-3, the inventive multilayer films have surprising and unexpected improvement in properties.

Example 4

Three Layer Blown film

A number of three layer blown films (Examples 4A-I and comparative example 4) were made that comprised a cling layer (A), a core layer (B), and a release layer (C). The films had a total thickness of 25 microns. The cling layer (A) and release layer (C) each comprised 15% of the film's total thickness while the core layer comprised 70% of the film's total thickness.

The films were made on a blown extrusion line equipped with extruders and a blown film die. The line parameters were as follows: BUR 2.5, calendar speed 38.9 m/min, die gap 2.5 mm, RPM ext A/B/C was 33.6/53.7/21, the total output was 85 kg/hr, and the nip roll was approximately 40° C.

The composition of layers A and C for the various blown films was varied as shown in the table below, in all the examples below, the composition of the core layer (B) was LLDPE of density of 0.918 g/cm³ and melt index of 0.85 g/10 min. (190 C/2.16 kg) currently sold as Dowlex 2645™ by The Dow Chemical Company.

| Example No. | Cling layer (A) | Release layer (C) |
|---|---|---|
| 4A | 100% Polymer A | 100% Polymer D |
| 4B | 100% Polymer A | 98% Polymer D and 2% I-PP |
| 4C | 98% Polymer A and 2% I-PP | 100% Polymer D |
| 4D | 99% Polymer A and 1% I-PP | 99% Polymer D and 1% I-PP |
| 4E | 100% Polymer A | 100% Polymer E |
| 4F | 100% Polymer A | 98% Polymer E and 2% I-PP |
| 4G | 98% Polymer A and 2% I-PP | 100% Polymer E |
| 4H | 99% Polymer A and 1% I-PP | 99% Polymer E and 1% I-PP |
| 4I | 100% Polymer B | 100% Polymer D |
| Comparative Example 4 | 95% Polymer C and 5% PIB | 100% Polymer D |

All percentages above are based on total weight of the layer's composition.
Polymer A is an ethylene-octene polymer of density of 0.870 g/cm³ and melt index of 1.0 g/10 min. (190 C/2.16 kg) and melt flow ratio $I_{10}/I_2$ of 7.8 (ASTM 1238) currently sold as AFFINITY 8100™ available from The Dow Chemical Company.
Polymer B is an ethylene-octene block interpolymer of density of 0.866 g/cm³ and melt index of 1 g/10 min. (190 C/2.16 kg) (ASTM 1238).
Polymer C is LLDPE of density of 0.918 g/cm³ and melt index of 0.85 g/10 min. (190 C/2.16 kg) currently sold as Dowlex 2645™ by The Dow Chemical Company.

Polymer D is LDPE of density of 0.923 g/cm³ and melt index of 0.75 g/10 min. (190 C/2.16 kg) currently sold as LDPE 250™ by The Dow Chemical Company.
Polymer E is a PBPE of density of 0.888 g/cm³ and melt index of 2 g/10 min. (190 C/2.16 kg) currently VERSIFY™ 2000 plastomer sold by The Dow Chemical Company.
PIB is polyisobutylene of molecular weight of 2000-4000 g/mol available from Polytech.
I-PP is a PP based masterbatch of Irgasurf™ CGXF410 available from Ciba-Geigy.

Testing of Examples 4A-4I and Comparative Example 4

The films of Examples 4A-4I and Comparative Example 4 were tested for cling and noise using the Dow Method, Highlight tester described earlier wherein the films are pre-stretched to 200%. The results are shown in the Table below. The results show that the inventive multilayer films of 4A-4I have surprising and unexpected improvement in properties over conventional films comprising polyisobutylene.

| Example No. | Noise (dB) | Stretched Cling (g) |
|---|---|---|
| Comparative Example 4 | 100 | 210 |
| 4A | 74.4 | 315.5 |
| 4B | 85.3 | 293.2 |
| 4C | 86.5 | 287.3 |
| 4D | 77.1 | 259.9 |
| 4E | 117 | 254.3 |
| 4F | 112 | 261.1 |
| 4G | 114 | 280.1 |
| 4H | 118 | 291.5 |
| 4I | 77.2 | 397.1 |

Example 5

32 Layer Cast, Stretch Film 32 layer cast film having a total thickness of 23 microns was fabricated in a similar manner to Example 2 above except that each layer in the 32 layer cast film comprised 100% by weight of a linear low density ethylene-octene copolymer having a density of 0.92 g/cm³, a melt index of 3.7 g/10 min. (190° C./2.16 kg, ASTM D1238), and a melt flow rate ratio ($I_{10}/I_2$) of 7.5 currently sold as Dowlex™ SC 2111G by The Dow Chemical Company.

Comparative Example 5

3 Layer Cast, Stretch Film

Comparative Example 2 was repeated except that the linear low density ethylene-octene copolymer used in Example 5 (Dowlex™ SC 2111G) was employed in place of the Dowlex 2606™ used in comparative Example 2.

The process parameters and results for example 5 and comparative example 5 are shown in the table below.

| | | units | 32 layer Ex. 5 | 3 layer Com. Ex. 5 |
|---|---|---|---|---|
| Coextrusion Cast | Amps - Ext. A | A | 1.4 | 2.2 |
| | Amps - Ext. B | A | 3.1 | 3 |
| | Amps - Ext. C | A | 2.1 | 2 |
| | Amps - Ext. D | A | 0 | 0 |
| | Die gap | mm | 0.3 | 0.3 |
| | Layer Percentage - Ext. A | % | 25 | 33 |
| | Layer Percentage - Ext. B | % | 50 | 33 |
| | Layer Percentage - Ext. C | % | 25 | 33 |
| | Layer Percentage - Ext. D | % | 0 | 0 |
| | Melt Pressure - Ext. A | bar | 48 | 66 |
| | Melt Pressure - Ext. B | bar | 0 | 73 |
| | Melt Pressure - Ext. C | bar | 48 | 78 |
| | Melt Pressure - Ext. D | bar | 0 | 0 |
| | Melt Temperature - Ext. A | Deg C. | 210 | 199 |
| | Melt Temperature - Ext. B | Deg C. | 209 | 199 |
| | Melt Temperature - Ext. C | Deg C. | 216 | 199 |
| | Melt Temperature - Ext. D | Deg C. | 0 | 0 |
| | RPM - Ext. A | rpm | 27 | 41 |
| | RPM - Ext. B | rpm | 29 | 21 |
| | RPM - Ext. C | rpm | 15 | 40 |
| | RPM - Ext. D | rpm | 0 | 0 |
| | Structure | (blank) | | |
| | Take-off speed | m/min | 11 | 14 |
| | Total Output | kg/h | 5 | 6 |
| | Total Thickness | um | 23 | 23 |
| Dart Drop Impact - Type A | Impact | g | 112 | 145 |
| | Std Dev Impact | (blank) | 3.06 | 4.52 |
| Elmendorf Tear - CD | Average Elmendorf CD | g | 343 | 390 |
| | Std Dev Elmendorf (%) | (blank) | 6.9 | 6.1 |
| Elmendorf Tear - MD | Average Elmendorf MD | g | 237 | 279 |
| | Std Dev Elmendorf (%) | (blank) | 7.8 | 7.4 |
| Highlight Ultimate | Average Thickness | um | 23 | 22 |
| | Maximum Stretch % | % | 424 | 409 |
| | Maximum Stretch Force | kg | 11.3 | 10.7 |
| | Maximum Unwind Force | kg | 1.1 | 0.5 |
| Puncture | Puncture Elongation | mm | 161.3 | 161.6 |
| | Puncture Energy | J | 3.258 | 2.66 |
| | Puncture Force | N | 39.88 | 33.4 |
| | Puncture Resistance | J/cm$^3$ | 17.19 | 14.8 |
| | Std Dev Puncture Elongation (mm) | (blank) | 3.0723 | 2.1125 |
| | Std Dev Puncture Energy (J) | (blank) | 0.1297 | 0.0486 |
| | Std Dev Puncture Force (N) | (blank) | 0.5008 | 0.5 |
| | Std Dev Puncture Resistance (J/cm$^3$) | (blank) | 0.7554 | 0.2706 |
| | Std Dev Thickness (um) | (blank) | 0.4472 | 0 |
| | Thickness | μm | 23.2 | 22 |
| Tensile - MD - Film | Strain at Break | % | 573.55 | 527.56 |
| | Strain at Tensile Strength | % | 573.23 | 527.39 |
| | Strain at Yield | % | 5.2 | 5.62 |
| | Stress at Break | MPa | 27.13 | 29 |
| | Stress at Yield | MPa | 7.29 | 5.87 |
| | Tensile Strength | MPa | 27.15 | 29 |
| | Thickness | μm | 23 | 21.6 |
| | Toughness | MJ/m3 | 72.39 | 67.37 |
| Thickness Distribution | Average Thickness | um | 22.7 | 21.4 |
| | Thickness High Value | um | 23 | 23 |
| | Thickness Low Value | um | 22 | 20 |
| | Thickness Standard deviation | um | 0.46 | 1.02 |

Example 6

32 Layer Cast, Stretch Film

A 32 layer cast film having a total thickness of 23 microns was fabricated in a similar manner to Example 2 above except that each layer in the 32 layer cast film comprised 100% by weight of a linear low density ethylene-octene copolymer having a density of 0.918 g/cm³, a melt index of 2.3 g/10 min. (190° C./2.16 kg, ASTM D1238), and a melt flow rate ratio ($I_{10}/I_2$) of 7.7 currently sold as Dowlex™ 2607G by The Dow Chemical Company.

Comparative Example 6

3 Layer Cast, Stretch Film

Comparative Example 2 was repeated except that the linear low density ethylene-octene copolymer used in Example 6 (Dowlex™ 2607G) was employed in place of the Dowlex 2606™ used in comparative Example 2.

The process parameters and results for example 6 and comparative example 6 are shown in the table below:

|  |  | units | 32 layer Ex. 6 | 3 layer Com. Ex. 6 |
|---|---|---|---|---|
| Coextrusion Cast | Amps - Ext. A | A | 2.2 | 2.5 |
|  | Amps - Ext. B | A | 2.6 | 3.4 |
|  | Amps - Ext. C | A | 2.7 | 2.4 |
|  | Amps - Ext. D | A | 0 | 0 |
|  | Die gap | mm | 0.3 | 0.3 |
|  | Layer Percentage - Ext. A | % | 33 | 33 |
|  | Layer Percentage - Ext. B | % | 33 | 33 |
|  | Layer Percentage - Ext. C | % | 33 | 33 |
|  | Layer Percentage - Ext. D | % | 0 | 0 |
|  | Melt Pressure - Ext. A | bar | 68 | 88 |
|  | Melt Pressure - Ext. B | bar | 14 | 93 |
|  | Melt Pressure - Ext. C | bar | 72 | 98 |
|  | Melt Pressure - Ext. D | bar | 0 | 0 |
|  | Melt Temperature - Ext. A | Deg C. | 210 | 200 |
|  | Melt Temperature - Ext. B | Deg C. | 207 | 200 |
|  | Melt Temperature - Ext. C | Deg C. | 216 | 198 |
|  | Melt Temperature - Ext. D | Deg C. | 0 | 0 |
|  | RPM - Ext. A | rpm | 18 | 41 |
|  | RPM - Ext. B | rpm | 18 | 21 |
|  | RPM - Ext. C | rpm | 18 | 40 |
|  | RPM - Ext. D | rpm | 0 | 0 |
|  | Structure | (blank) |  |  |
|  | Take-off speed | m/min | 10 | 14 |
|  | Total Output | kg/h | 5 | 6 |
|  | Total Thickness | um | 23 | 23 |
| Dart Drop Impact - Type A | Impact | g | 145 | 167.5 |
|  | Std Dev Impact | (blank) |  | 20.14 |
| Elmendorf Tear - CD | Average Elmendorf CD | g | 412 | 383 |
|  | Std Dev Elmendorf (%) | (blank) | 5.1 | 8 |
| Elmendorf Tear - MD | Average Elmendorf MD | g | 254 | 217 |
|  | Std Dev Elmendorf (%) | (blank) | 4.2 | 5.1 |
| Highlight Ultimate | Average Thickness | um | 23 | 23 |
|  | Maximum Stretch % | % | 369 | 325 |
|  | Maximum Stretch Force | kg | 11.8 | 10.2 |
|  | Maximum Unwind Force | kg | 0.7 | 0.6 |
| Puncture | Puncture Elongation | mm | 175.3 | 163.4 |
|  | Puncture Energy | J | 4.081 | 3.243 |
|  | Puncture Force | N | 46.43 | 40.77 |
|  | Puncture Resistance | J/cm^3 | 21.81 | 18.04 |
|  | Std Dev Puncture Elongation (mm) | (blank) | 4.6083 | 8.0551 |
|  | Std Dev Puncture Energy (J) | (blank) | 0.2427 | 0.3129 |
|  | Std Dev Puncture Force (N) | (blank) | 1.296 | 1.8926 |
|  | Std Dev Puncture Resistance (J/cm^3) | (blank) | 1.3093 | 1.7407 |
|  | Std Dev Thickness (um) | (blank) | 0.2236 | 0 |
|  | Thickness | μm | 22.9 | 22 |
| Tensile - MD - Film | Strain at Break | % | 476.08 | 494.49 |
|  | Strain at Tensile Strength | % | 476.23 | 494.29 |
|  | Strain at Yield | % | 12.1 | 5.74 |
|  | Stress at Break | MPa | 28.08 | 39.65 |
|  | Stress at Yield | MPa | 7.42 | 5.75 |
|  | Tensile Strength | MPa | 28.08 | 39.66 |
|  | Thickness | μm | 22.5 | 20.6 |
|  | Toughness | MJ/m^3 | 62.57 | 76.81 |
| Thickness Distribution | Average Thickness | um | 24.2 | 23.8 |
|  | Thickness High Value | um | 26 | 24 |
|  | Thickness Low Value | um | 23 | 23 |
|  | Thickness Standard deviation | um | 0.75 | 0.6 |

Example 7

32 Layer Cast, Stretch Film

A 32 layer cast film having a total thickness of 23 microns was fabricated in a similar manner to Example 2 above except that each layer in the 32 layer cast film comprised 100% by weight of a linear low density ethylene-octene copolymer having a density of 0.918 g/cm$^3$, a melt index of 2.3 g/10 min. (190° C./2.16 kg, ASTM D 1238), and a melt flow rate ratio ($I_{10}/I_2$) of 7.5 currently sold as Dowlex™ 2107G by The Dow Chemical Company.

Comparative Example 7

3 Layer Cast, Stretch Film

Comparative Example 2 was repeated except that the linear low density ethylene-octene copolymer used in Example 7 (Dowlex™ 2107G) was employed in place of the Dowlex 2606™ used in comparative Example 2.

The process parameters and results for example 7 and comparative example 7 are shown in the table below:

|   |   | Units | 32 layer Ex. 7 | 3 layer Com. Ex. 7 |
|---|---|---|---|---|
| Coextrusion Cast | Amps - Ext. A | A | 2.2 | 2.4 |
|  | Amps - Ext. B | A | 2.5 | 3.4 |
|  | Amps - Ext. C | A | 2.7 | 2.3 |
|  | Amps - Ext. D | A | 0 | 0 |
|  | Die gap | mm | 0.3 | 0.3 |
|  | Layer Percentage - Ext. A | % | 33 | 33 |
|  | Layer Percentage - Ext. B | % | 33 | 33 |
|  | Layer Percentage - Ext. C | % | 33 | 33 |
|  | Layer Percentage - Ext. D | % | 0 | 0 |
|  | Melt Pressure - Ext. A | bar | 67 | 84 |
|  | Melt Pressure - Ext. B | bar | 14 | 93 |
|  | Melt Pressure - Ext. C | bar | 71 | 97 |
|  | Melt Pressure - Ext. D | bar | 0 | 0 |
|  | Melt Temperature - Ext. A | Deg C. | 212 | 199 |
|  | Melt Temperature - Ext. B | Deg C. | 207 | 200 |
|  | Melt Temperature - Ext. C | Deg C. | 217 | 199 |
|  | Melt Temperature - Ext. D | Deg C. | 0 | 0 |
|  | RPM - Ext. A | rpm | 18 | 41 |
|  | RPM - Ext. B | rpm | 18 | 21 |
|  | RPM - Ext. C | rpm | 18 | 40 |
|  | RPM - Ext. D | rpm | 0 | 0 |
|  | Structure | (blank) |  |  |
|  | Take-off speed | m/min | 9.8 | 14 |
|  | Total Output | kg/h | 5 | 6 |
|  | Total Thickness | um | 23 | 23 |
| Dart Drop Impact - Type A | Impact | g | 200 | 215.5 |
|  | Std Dev Impact | (blank) | 0.94 | 28.89 |
| Elmendorf Tear - CD | Average Elmendorf CD | g | 514 | 387 |
|  | Std Dev Elmendorf (%) | (blank) | 8.1 | 5.8 |
| Elmendorf Tear - MD | Average Elmendorf MD | g | 308 | 284 |
|  | Std Dev Elmendorf (%) | (blank) | 4.5 | 7.2 |
| Highlight Ultimate | Average Thickness | um | 23 | 23 |
|  | Maximum Stretch % | % | 412 | 360 |
|  | Maximum Stretch Force | kg | 11.5 | 11.1 |
|  | Maximum Unwind Force | kg | 0.7 | 0.6 |
| Puncture | Puncture Elongation | mm | 182.3 | 184.4 |
|  | Puncture Energy | J | 4.094 | 3.854 |
|  | Puncture Force | N | 44.42 | 42.66 |
|  | Puncture Resistance | J/cm$^3$ | 21.82 | 21.07 |
|  | Std Dev Puncture Elongation (mm) | (blank) | 4.7193 | 6.6183 |
|  | Std Dev Puncture Energy (J) | (blank) | 0.2195 | 0.241 |
|  | Std Dev Puncture Force (N) | (blank) | 1.0576 | 1.3366 |
|  | Std Dev Puncture Resistance (J/cm$^3$) | (blank) | 1.5989 | 1.2156 |
|  | Std Dev Thickness (um) | (blank) | 1 |  |
|  | Thickness | μm | 23 | 22.4 |
| Tensile - MD - Film | Strain at Break | % | 522.7 | 506.51 |
|  | Strain at Tensile Strength | % | 522.5 | 506.51 |
|  | Strain at Yield | % | 6.38 | 5.9 |
|  | Stress at Break | MPa | 31.79 | 34.95 |
|  | Stress at Yield | MPa | 6.22 | 5.56 |
|  | Tensile Strength | MPa | 31.82 | 34.95 |
|  | Thickness | μm | 21.7 | 21.3 |
|  | Toughness | MJ/m$^3$ | 70.67 | 70.23 |
| Thickness Distribution | Average Thickness | um | 24.2 | 22.5 |
|  | Thickness High Value | um | 25 | 23 |
|  | Thickness Low Value | um | 23 | 21 |
|  | Thickness Standard deviation | um | 0.6 | 0.67 |

Examples 5-7 show that one or more of the following properties may be improved by use of a 32 layer structure over a 3 layer structure of substantially the same thickness: tear resistance, elongation, and/or puncture often with substantially equivalent Dart drop impact resistance.

Example 8

32 Layer Film

A 32 layer film having a total thickness of 23 microns could be fabricated in a similar manner to Example 2 above except that each layer in the 32 layer cast film could comprise 100% by weight of a polypropylene-ethylene interpolymer such as those currently sold as Versify™ by The Dow Chemical Company as described above instead of a linear low density ethylene-octene copolymer. Such a 32 layer film would be likely show improved properties such as tear resistance, elongation and/or puncture over a 3 layer structure of substantially the same thickness with the same or similar polymer blends.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of any compounds or steps not enumerated herein. Variations and modifications from the described embodiments exist. Finally, any number disclosed herein should be construed to mean approximate, regardless of whether the word "about" or "approximately" is used in describing the number. The appended embodiments and claims intend to cover all those modifications and variations as falling within the scope of the invention.

Embodiments

1. A multilayer film having a total thickness of from about 10 to about 50 microns wherein said film comprises at least five layers and wherein at least one inner layer comprises a polypropylene-ethylene interpolymer.

2. The multilayer film of any preceding claim wherein said inner layer comprising the polypropylene-ethylene interpolymer comprises from about 10 to 50 percent of the total film thickness.

3. The multilayer film of any preceding claim, wherein the density of the polypropylene-ethylene interpolymer is from about 0.80 g/cm$^3$ to 0.90 g/cm$^3$ according to ASTM D-792.

4. The multilayer film of any preceding claim, wherein the density of the polypropylene-ethylene interpolymer is from about 0.84 g/cm$^3$ to about 0.89 g/cm$^3$ according to ASTM D-792.

5. The multilayer film of any preceding claim, wherein the DSC glass transition temperature of the polypropylene-ethylene interpolymer is less than about −20° C.

6. The multilayer film of any preceding claim, wherein the total crystallinity of the polypropylene-ethylene interpolymer is less than about 20%.

7. The multilayer film of any preceding claim, wherein the melt flow rate of the polypropylene-ethylene interpolymer is from about 1 to about 30 according to ASTM D1238 230° C./2.16 kg.

8. The multilayer film of any preceding claim, wherein the melt flow rate of the polypropylene-ethylene interpolymer is from about 5 to about TO according to ASTM D1238 230° C./2.16 kg.

9. The multilayer film of any preceding claim, wherein the polypropylene-ethylene interpolymer is characterized by a melt flow rate of from about 5 to about 10 according to ASTM D1238 230° C./2.16 kg, a density of from about 0.84 g/cm$^3$ to about 0.87 g/cm$^3$ according to ASTM D-792, a DSC glass transition temperature of the polypropylene-ethylene interpolymer is less than about −20° C. and a total crystallinity of less than about 20%.

10. The multilayer film of any preceding claim wherein said film consists of five layers.

11. The multilayer film of any preceding claim wherein the film is a cast stretch film.

12. The multilayer film of any preceding claim wherein at least one inner layer comprising a polypropylene-ethylene interpolymer is the innermost layer.

13. The multilayer film of any preceding claim wherein the at least one inner layer further comprises a second polymer.

14. The multilayer film of any preceding claim wherein the at least one inner layer further comprises a second polymer selected from the group consisting of polyolefins, polystyrene, polyesters, polycarbonates, polyamides and combinations thereof.

15. The multilayer film of any preceding claim wherein the at least one inner layer further comprises a second polymer selected from the group consisting of polyethylene, polypropylene, polybutadiene, and combinations thereof.

16. The multilayer film of any preceding claim wherein the at least one inner layer further comprises a second polymer selected from the group consisting of linear very low density polyethylene, linear low density polyethylene, and linear medium density polyethylene and combinations thereof.

17. The multilayer film of any preceding claim wherein the total film thickness is from about 20 to about 30 microns.

18. The multilayer film of any preceding claim wherein at least one of the outer layers of said film comprises a polymer selected from the group consisting of linear very low density polyethylene, linear low density polyethylene, linear medium density polyethylene, and polypropylene-ethylene interpolymer.

19. The multilayer film of any preceding claim wherein both outer layers of said film comprise a polymer selected from the group consisting of linear very low density polyethylene, linear low density polyethylene, linear medium density polyethylene, and polypropylene-ethylene interpolymer.

20. The multilayer film of any preceding claim wherein each outer layer of said film comprises from about 10 to 20 percent of the total film thickness.

21. The multilayer film of any preceding claim wherein each inner layer of said film comprises from about 20 to 30 percent of the total film thickness.

22. The multilayer film of any preceding claim wherein the average cling of the film is greater than about 80 g according to ASTM D 5458.

23. The multilayer film of any preceding claim wherein the Dan drop impact resistance is greater than about 150 g according to ISO 7765-1.

24. The multilayer film of any preceding claim wherein the strain at break is greater than about 440% according to ISO 527-3/2000.

25. The multilayer film of any preceding claim wherein the ultimate elongation is greater than about 440% according to ISO 527-3/2000.

26. The multilayer film of any preceding claim wherein the puncture resistance at 250% is greater than about 0.4 kg according to ASTM D-5748.

27. A multilayer film comprising a linear low density polyethylene wherein said film has a total thickness of from about 10 to about 50 microns and wherein said film comprises from about 6 to about 2000 layers.

28. The multilayer film of any preceding claim wherein said film has a total thickness of from about 17 to about 30 microns.

29. The multilayer film of any preceding claim, wherein the multilayer film comprises from about 10 to about 100 layers.

30. The multilayer film of any preceding claim wherein each layer comprises the same linear low density polyethylene.

31. The multilayer film of any preceding claim further comprising a polymer selected from the group consisting of polyolefins, polystyrene, polyesters, polycarbonates, polyamides and combinations thereof.

32. The multilayer film of any preceding claim further comprising a polymer selected from the group consisting of polyethylene, polypropylene, polybutadiene, and combinations thereof.

33. The multilayer film of any preceding claim further comprising a polymer selected from the group consisting of linear very low density polyethylene, linear medium density polyethylene, polypropylene-ethylene interpolymer and combinations thereof.

34. The multilayer film of any preceding claim wherein the multilayer film comprises from about 10 to about 100 layers comprising the same polymer in each layer and wherein said multilayer film is characterized by a stretch of at least 20 percent greater according to Dow method Highlight tester than a comparable three layer film having the same total thickness and same composition in each layer as said multilayer film 35. The multilayer film of any preceding claim wherein the multilayer film comprises from about 10 to about 100 layers comprising the same polymer in each layer and wherein said multilayer film is characterized by an Elmendorf tear strength in the cross-direction of at least 20 percent greater than a comparable three layer film having the same total thickness and same polymer in each layer as said multilayer film. ASTM D-1922.

36. A multilayer film comprising a cling layer, a core layer, and a release layer wherein said release layer comprises a polymer selected from the group consisting of low density polyethylene, polypropylene-ethylene interpolymer, and combinations thereof.

37. The multilayer film of any preceding claim, wherein the density of the polypropylene-ethylene interpolymer is from about 0.85 g/cm³ to 0.91 g/cm³ according to ASTM D-792.

38. The multilayer film of any preceding claim, wherein the density of the polypropylene-ethylene interpolymer is from about 0.875 g/cm³ to about 0.90 g/cm³ according to ASTM D-792.

39. The multilayer film of any preceding claim, wherein the DSC glass transition temperature of the polypropylene-ethylene interpolymer is less than about −10° C.

40. The multilayer film of any preceding claim, wherein the total crystallinity of the polypropylene-ethylene interpolymer is less than about 60%.

41. The multilayer film, of any preceding claim, wherein the melt flow rate of the polypropylene-ethylene interpolymer is from about 1 to about 30 according to ASTM D1238 230° C./2.16 kg.

42. The multilayer film of any preceding claim, wherein the melt flow rate of the polypropylene-ethylene interpolymer is from about 0.5 to about 5 according to ASTM D1238 230° C./2.16 kg.

43. The multilayer film of any preceding claim wherein said cling layer comprises polyethylene.

44. The multilayer film of any preceding claim wherein said cling layer comprises polyethylene having a density of from about 0.85 g/cm³ to about 0.91 g/cm³ according to ASTM D-792, an ethylene/α-olefin block interpolymer, ethylene-vinyl acetate copolymer and combinations thereof.

45. The multilayer film of any preceding claim wherein said core layer comprises linear low density polyethylene.

46. The multilayer film of any preceding claim wherein said film has a total thickness of from about 10 to about 50 microns.

47. The multilayer film of any preceding claim wherein said film has a total thickness of from about 15 to about 35 microns.

48. The multilayer film of any preceding claim wherein said cling layer further comprises a hydrophilizing additive.

49. The multilayer film of any preceding claim wherein said release layer further comprises a hydrophilizing additive.

50. The multilayer film of any preceding claim wherein said film is substantially free of polyisobutylene.

51. The multilayer film of any preceding claim wherein said cling layer comprises from about 10 to about 30 percent of the total film thickness said core layer comprises from about 40 to about 80 percent of the total film thickness, and said release layer comprises from 10 to about 30 percent of the total film thickness.

52. The multilayer film of any preceding claim wherein the average cling of the film is greater than about 240 g according to ASTM D 5458.

The invention claimed is:

1. A multilayer film comprising a thermoplastic polymer wherein said film has a total thickness of from about 10 to about 30 microns and wherein said film comprises from at least 10 to about 2000 layers, the film comprising:
   10 or more layers each layer consisting of the same linear low density polyethylene with the same properties; and
   each of the 10 or more layers is in direct contact with at least one other layer of the 10 or more layers wherein the multilayer film has a cross direction (CD) Elmendorf tear greater than 400 g.

2. The multilayer film of claim 1 wherein said film has a total thickness of from about 17 microns to about 30 microns.

3. The multilayer film of claim 1 wherein the linear low density polyethylene is an ethylene-octene copolymer.

4. The multilayer film of claim 1 further comprising an inner layer comprising a polypropylene-ethylene interpolymer.

5. The multilayer film of claim 4 wherein the density of the polypropylene-ethylene interpolymer is from about 0.85 g/cm³ to 0.91 g/cm³ according to ASTM D-792.

6. The multilayer film of claim 4 wherein the total crystallinity of the polypropylene-ethylene interpolymer is less than about 20%.

7. The multilayer film of claim 4 wherein the polypropylene-ethylene interpolymer is characterized by a melt flow rate of from about 5 g/10 min to about 10 g/10 min according to ASTM D1238 230° C./2.16 kg, a density of from about 0.84 g/cm³ to about 0.87 g/cm³ according to ASTM D-792, a DSC glass transition temperature of the polypropylene-ethylene interpolymer is less than about −20° C., and a total crystallinity of less than about 20%.

8. The multilayer film of claim 1 wherein the average cling of the film is greater than about 80 g according to ASTM D 5458.

9. The multilayer film of claim 1 wherein the Dart drop impact resistance is greater than about 150 g according to ISO 7765-1.

10. The multilayer film of claim 1 wherein the strain at break is greater than about 440% according to ISO 527-3/2000.

11. The multilayer film of claim 1 wherein the ultimate elongation is greater than about 440% according to ISO 527-3/2000.

12. The multilayer film of claim 1 wherein the puncture resistance at 250% is greater than about 0.4 kg according to ASTM D-5748.

13. The multilayer film of claim 1 comprising a release layer comprising of a linear low density polyethylene.

14. The multilayer film of claim 1 comprising a cling layer comprising a polyethylene.

15. The multilayer film of claim 1 comprising two outer layers, each outer layer comprising from 10% to 20% of the total film thickness.

16. The multilayer film of claim 1 wherein the film is a cast stretch film.

17. The multilayer film of claim 1 wherein the linear low density polyethylene is a heterogeneous linear low density polyethylene.

18. The multilayer film of claim 17 wherein the heterogeneous linear low density polyethylene is an ethylene-octene copolymer.

* * * * *